US011649183B2

United States Patent
Hatta et al.

(10) Patent No.: US 11,649,183 B2
(45) Date of Patent: May 16, 2023

(54) WATER TREATMENT PLANT

(71) Applicant: Mitsubishi Electric Corporation, Tokyo (JP)

(72) Inventors: Natsumi Hatta, Tokyo (JP); Takushi Kawada, Tokyo (JP); Go Wakamatsu, Tokyo (JP); Kenta Shimoda, Tokyo (JP); Nozomu Yasunaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 230 days.

(21) Appl. No.: 17/253,633

(22) PCT Filed: Jul. 26, 2018

(86) PCT No.: PCT/JP2018/028151
§ 371 (c)(1),
(2) Date: Dec. 18, 2020

(87) PCT Pub. No.: WO2020/021687
PCT Pub. Date: Jan. 30, 2020

(65) Prior Publication Data
US 2021/0171383 A1    Jun. 10, 2021

(51) Int. Cl.
*C02F 1/00*        (2023.01)
*C02F 9/00*        (2023.01)
(Continued)

(52) U.S. Cl.
CPC ............... *C02F 9/00* (2013.01); *C02F 1/008* (2013.01); *C02F 3/006* (2013.01); *G06N 3/08* (2013.01);
(Continued)

(58) Field of Classification Search
CPC ............... C02F 9/00; C02F 2209/001; C02F 2209/006; C02F 2209/008; C02F 1/008;
(Continued)

(56) References Cited

U.S. PATENT DOCUMENTS 6,808,630 B2    10/2004   Yang
9,440,870 B2 *   9/2016   Robertson ............... C02F 3/302
(Continued)

FOREIGN PATENT DOCUMENTS

JP    2000-218263 A    8/2000
JP    2002-126721 A    5/2002
(Continued)

OTHER PUBLICATIONS

International Search Report and Written Opinion dated Oct. 2, 2018, received for PCT Application No. PCT/JP2018/028151, Filed on Jul. 26, 2018,10 pages including English Translation.
(Continued)

*Primary Examiner* — Joseph W Drodge
(74) *Attorney, Agent, or Firm* — Xsensus LLP

(57) ABSTRACT

A water treatment plant includes a central monitoring device, a control device, a control device, and a computation unit, and causes a water treatment apparatus and a water treatment apparatus to execute water treatment. The central monitoring device monitors the water treatment apparatus and the water treatment apparatus. The control device performs a first control for the water treatment apparatus. The control device performs a second control for the water treatment apparatus. The computation unit is located outside the central monitoring device and performs a first computation related to the first control using a first calculation model generated by a first machine learning.

19 Claims, 13 Drawing Sheets

(51) Int. Cl.
*C02F 3/00* (2023.01)
*G06N 3/08* (2023.01)

(52) U.S. Cl.
CPC .. *C02F 2209/001* (2013.01); *C02F 2209/006* (2013.01)

(58) Field of Classification Search
CPC ............... C02F 2001/007; C02F 3/006; C02F 2209/22; G06N 99/00; G06N 3/02; G06N 3/08; G06N 7/023; G06N 20/00; B01D 17/12; B01D 21/30; B01D 21/34
See application file for complete search history.

(56) References Cited

U.S. PATENT DOCUMENTS

| | | | |
|---|---|---|---|
| 2016/0046503 A1* | 2/2016 | Hoek | C02F 1/44 210/741 |
| 2016/0188207 A1* | 6/2016 | Choi | G06F 3/0644 711/153 |
| 2016/0272519 A1* | 9/2016 | Ledwell | C02F 3/308 |
| 2016/0340206 A1* | 11/2016 | Antos | C02F 1/008 |
| 2017/0097647 A1* | 4/2017 | Lunani | G05B 15/02 |
| 2018/0161694 A1* | 6/2018 | Lee | B01D 1/2896 |
| 2018/0282180 A1* | 10/2018 | Fujioka | G05B 13/0265 |
| 2018/0365193 A1* | 12/2018 | Chattopadhyay | H03M 7/30 |

FOREIGN PATENT DOCUMENTS

| | | | | |
|---|---|---|---|---|
| JP | 2004-25160 A | | 1/2004 | |
| JP | 2013-161336 A | | 8/2013 | |
| JP | 2017056428 A | * | 3/2017 | ............ C02F 1/008 |
| JP | 2017-140595 A | | 8/2017 | |
| JP | 2017-143441 A | | 8/2017 | |
| JP | 2017-204110 A | | 11/2017 | |
| KR | 101621495 B1 | * | 5/2016 | ............ C02F 1/008 |
| WO | WO-2006130786 A2 | * | 12/2006 | .......... B01D 61/025 |
| WO | WO-2011131806 A1 | * | 10/2011 | ............ C02F 3/006 |
| WO | WO-2016073725 A1 | * | 5/2016 | ............ G06Q 50/26 |
| WO | 2018/070548 A1 | | 4/2018 | |

OTHER PUBLICATIONS

Mitsubishi Electric has Developed "Compact Artificial Intelligence", Mitsubishi Electric Corporation, Development No. 1611, Feb. 17, 2016, 6 pages including English Translation.

Notification of Reasons for Refusal dated Dec. 25, 2018, received for JP Application No. 2018-562682, 9 pages including English Translation.

Decision of Refusal dated Apr. 16, 2019, received for JP Application No. 2018-562682, 9 pages including English Translation.

* cited by examiner

| TIME | DETECTION DATA | | | | | | CONTROL TARGET VALUE | |
|---|---|---|---|---|---|---|---|---|
| t0 | D1(t0) | D2(t0) | D3(t0) | D4(t0) | ... | Dm(t0) | RV1(t0) | RV2(t0) |
| t1 | D1(t1) | D2(t1) | D3(t1) | D4(t1) | ... | Dm(t1) | RV1(t1) | RV2(t1) |
| ⋮ | ⋮ | ⋮ | ⋮ | ⋮ | ⋮ | ⋮ | ⋮ | ⋮ |
| tp | D1(tp) | D2(tp) | D3(tp) | D4(tp) | ... | Dm(tp) | RV1(tp) | RV2(tp) |

WATER TREATMENT PLANT

CROSS-REFERENCE TO RELATED APPLICATION

The present application is based on PCT filing PCT/JP2018/028151, filed Jul. 26, 2018, the entire contents of which are incorporated herein by reference.

FIELD

The present invention relates to a water treatment plant for performing water purification, sewage treatment, or the like.

BACKGROUND

In a water treatment plant, water treatment control is performed by changing control target values or control operation amounts according to environmental changes. For example, water treatment control that adapts to environmental changes is performed in the water treatment plant by changing control target values or control operation amounts according to seasonal temperature differences and changes in the flow rate of inflow water, the water quality of inflow water, and the like.

Control target values or control operation amounts are changed by operators based on past experience and the like, which requires expertise. Patent Literature 1 proposes a technique of using artificial intelligence (AI) for controlling a sewage treatment apparatus so that the experience of operators can be reflected in changing control target values according to environmental changes. This technique includes inputting, to an AI device, detection data output from a sensor that detects the internal state of the sewage treatment apparatus, and controlling the sewage treatment apparatus based on the output of the AI device.

CITATION LIST

Patent Literature

Patent Literature 1: Japanese Patent Application Laid-open No. 2004-25160

SUMMARY

Technical Problem

The above-described conventional technique enables AI-based water treatment control. However, although the water treatment plant includes a plurality of devices such as water treatment apparatuses, control devices, and a central monitoring device, the above-described conventional AI-based water treatment control technique does not consider the installation position of AI, and thus there is room for improvement.

The present invention has been made in view of the above, and an object thereof is to obtain a water treatment plant including a plurality of devices and capable of effectively performing water treatment control.

Solution to Problem

A water treatment plant according to the present invention causes a first water treatment apparatus and a second water treatment apparatus to execute water treatment, and includes a central monitoring device, a first control device, a second control device, and a first computation unit. The central monitoring device monitors the first water treatment apparatus and the second water treatment apparatus. The first control device performs a first control for the first water treatment apparatus. The second control device performs a second control for the second water treatment apparatus. The first computation unit is located outside the central monitoring device, and performs a first computation related to the first control using a first calculation model generated by a first machine learning.

Advantageous Effects of Invention

The present invention can achieve the effect of effectively performing water treatment control in a water treatment plant including a plurality of devices.

DESCRIPTION OF EMBODIMENTS

Hereinafter, a water treatment plant according to embodiments of the present invention will be described in detail based on the drawings. The present invention is not limited to the embodiments.

First Embodiment

Figure 1:
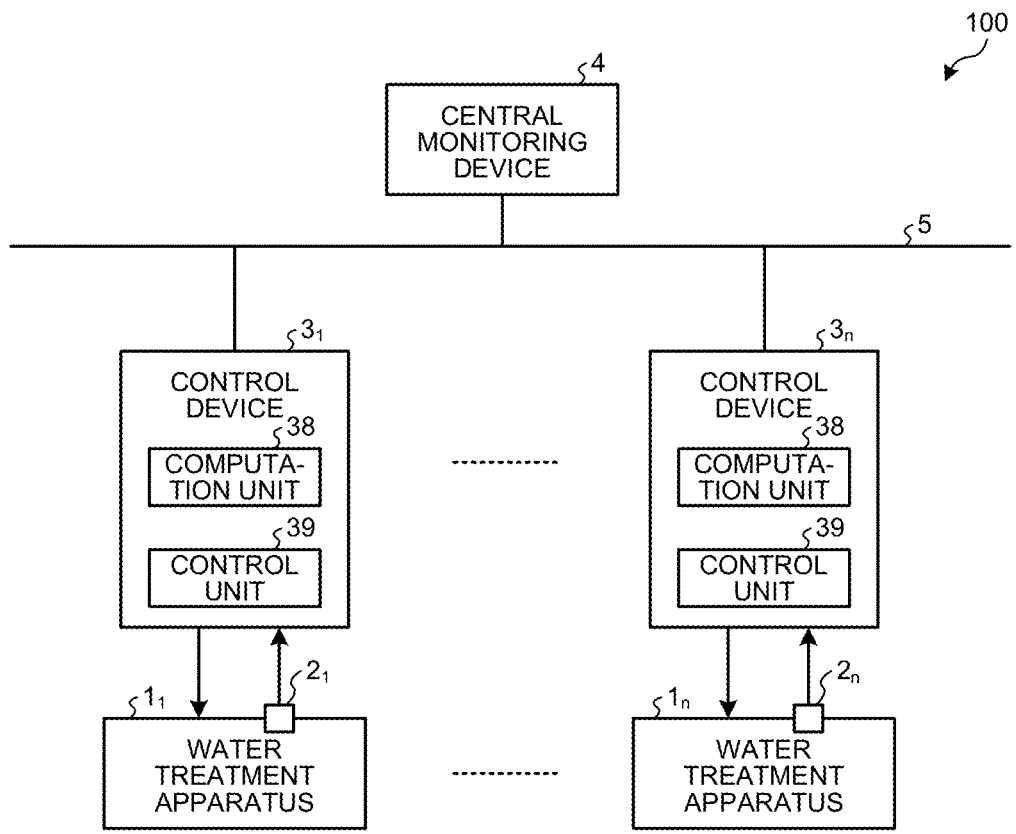
FIG. 1 is a diagram schematically illustrating a water treatment plant according to a first embodiment.

FIG. 1 is a diagram schematically illustrating a water treatment plant according to a first embodiment. As illustrated in FIG. 1, a water treatment plant 100 according to the first embodiment includes a plurality of water treatment apparatuses $1_1$ to $1_n$, a plurality of sensors $2_1$ to $2_n$ that detect the state of the plurality of water treatment apparatuses $1_1$ to $1_n$, respectively, control devices $3_1$ to $3_n$ that control the plurality of water treatment apparatuses $1_1$ to $1_n$, respectively, and a central monitoring device 4 that monitors the plurality of water treatment apparatuses $1_1$ to $1_n$. Note that reference character "n" is an integer of two or more.

The control devices $3_1$ to $3_n$ and the central monitoring device 4 are communicatively connected to each other via a communication network 5. The communication network 5 is, for example, a local area network (LAN), a wide area network (WAN), or a dedicated line.

The plurality of water treatment apparatuses $1_1$ to $1_n$ are, for example, apparatuses that perform water purification, sewage treatment, or the like. The sensor $2_1$ detects the water treatment environment of the water treatment apparatus $1_1$ and outputs detection data including the result of detection to the control device $3_1$. The control device $3_1$ controls the water treatment apparatus $1_1$ based on detection data output from the sensor $2_1$. Similarly, the sensor $2_n$ detects the water treatment environment of the water treatment apparatus $1_n$ and outputs detection data including the result of detection to the control device $3_n$. The control device $3_n$ controls the water treatment apparatus $1_n$ based on detection data output from the sensor $2_n$. The water treatment environment of the water treatment apparatuses $1_1$ to $1_n$ includes at least one of a water treatment environment inside the water treatment apparatuses $1_1$ to $1_n$ and a water treatment environment outside the water treatment apparatuses $1_1$ to $1_n$.

The central monitoring device 4 acquires detection data output from the plurality of sensors $2_1$ to $2_n$ via the control devices $3_1$ to $3_n$, and monitors the state of the plurality of water treatment apparatuses $1_1$ to $1_n$ based on the detection data. The central monitoring device 4 can cause the control devices $3_1$ to $3_n$ to control the water treatment apparatuses $1_1$ to $1_n$, respectively, based on operations from the operator of the water treatment plant 100.

Hereinafter, when no distinction is made between the plurality of water treatment apparatuses $1_1$ to $1_n$, they are collectively referred to as the water treatment apparatus 1. When no distinction is made between the plurality of sensors $2_1$ to $2_n$, they are collectively referred to as the sensor 2. When no distinction is made between the plurality of control devices $3_1$ to $3_n$, they are collectively referred to as the control device 3.

The control device 3 includes a computation unit 38 that performs computation related to the control of the water treatment apparatus 1 using a calculation model generated by machine learning, and a control unit 39 that controls the water treatment apparatus 1 based on the result of computation by the computation unit 38. The calculation model used by the computation unit 38 is, for example, a calculation model that receives input of detection data output from the sensor 2 and outputs information related to the control of the water treatment apparatus 1. The control device 3 is, for example, artificial intelligence (AI), and outputs information related to the control of the water treatment apparatus 1 through machine learning that is based on input detection data.

The computation unit 38 can obtain information on a predicted value of the water treatment environment of the water treatment apparatus 1 through computation with, for example, a calculation model that receives input of detection data output from the sensor 2 and outputs information on a predicted value of the water treatment environment of the water treatment apparatus 1 detected by the sensor 2. Based on the predicted value of the water treatment environment of the water treatment apparatus 1, the computation unit 38 computes a control target value for controlling the water treatment apparatus 1 such that the state of water treatment in the water treatment apparatus 1 satisfies a preset water treatment condition.

The control unit 39 can control the water treatment apparatus 1 based on information on a control target value obtained by the computation unit 38. The control target value is, for example, a target value of the amount of control on a control target device such as a pump or a blower that controls the state of water treatment in the water treatment apparatus 1. Note that the control unit 39 may be configured to control the water treatment apparatus 1 such that the state of water treatment in the water treatment apparatus 1 satisfies a preset water treatment condition from a predicted value of the water treatment environment of the water treatment apparatus 1 computed by the computation unit 38.

The computation unit 38 can also obtain information on a control target value for the water treatment apparatus 1 through computation with, for example, a calculation model that receives input of detection data output from the sensor 2 and outputs information on a control target value for a control target device. The control unit 39 can control the water treatment apparatus 1 based on information on a control target value obtained by the computation unit 38.

As described above, in the water treatment plant 100, each water treatment apparatus 1 includes the control device 3 that performs computation related to the control of the water treatment apparatus 1 using a calculation model generated by machine learning, and AI can be located near the water treatment apparatus 1. Therefore, for example, data transmission delays or the like can be reduced, and control processing for the water treatment apparatus 1 that is based on detection data output from the sensor 2 can be accelerated. Thus, water treatment control can be effectively performed in the water treatment plant including the plurality of water treatment apparatuses.

Figure 2:
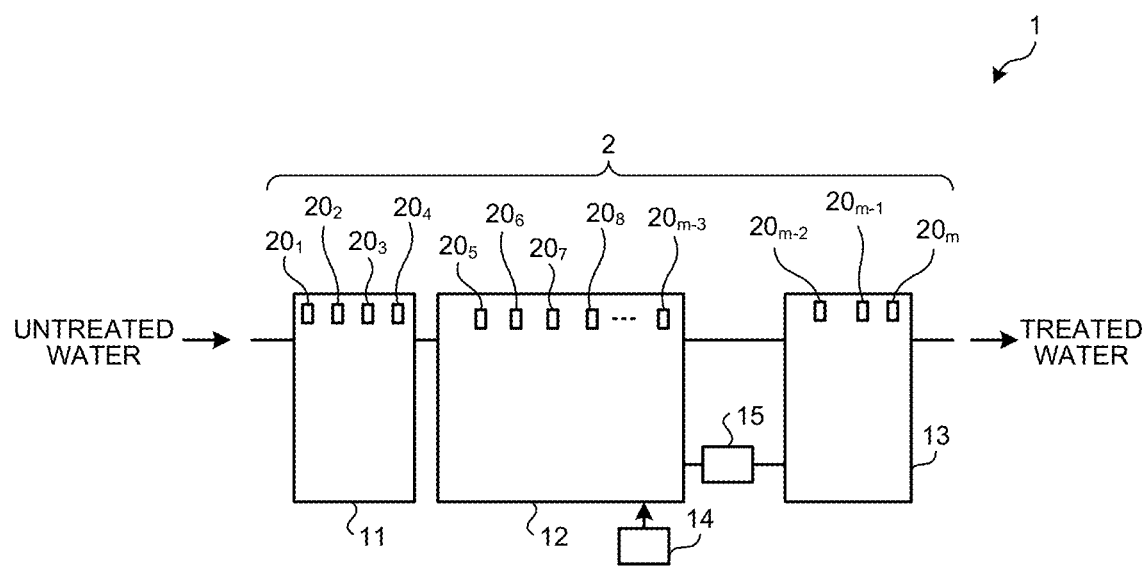
FIG. 2 is a diagram illustrating an exemplary configuration of a water treatment apparatus according to the first embodiment.

Hereinafter, the water treatment plant 100 according to the first embodiment will be described in detail. FIG. 2 is a diagram illustrating an exemplary configuration of the water treatment apparatus according to the first embodiment. In FIG. 2, only one of the plurality of water treatment apparatuses 1 illustrated in FIG. 1 is depicted. The following description refers to sewage treatment as an example of water treatment performed by the water treatment apparatus 1. Note that the water treatment plant 100 may have a configuration in which the plurality of water treatment apparatuses 1 perform the same type of water treatment, or a configuration in which some or all of the plurality of water treatment apparatuses 1 perform the same type of water treatment.

The water treatment apparatus 1 illustrated in FIG. 2 is a sewage treatment apparatus that treats sewage as untreated water. The water treatment apparatus 1 includes a primary settling tank 11, a treatment tank 12, and a final settling tank 13. The primary settling tank 11 stores sewage, which is inflow water from sewers or the like, and precipitates solid matter or the like that is relatively well settled in the sewage. The treatment tank 12 aerobically treats the supernatant water of the primary settling tank 11. The final settling tank 13 separates the activated sludge mixture flowing in from the treatment tank 12 into supernatant water and activated sludge. The supernatant water of the final settling tank 13 is discharged from the final settling tank 13 as treated water.

In the treatment tank 12, the supernatant water flowing in from the primary settling tank 11 contains organic matter. The organic matter contained in the supernatant water is treated, for example, by digestion of aerobic microorganisms such as phosphorus-accumulating bacteria, nitrifying bacteria, and denitrifying bacteria.

The water treatment apparatus 1 further includes a blower 14 and a pump 15. The blower 14 sends air into the treatment tank 12 to dissolve the air in the activated sludge mixture. The pump 15 is provided at a pipe that connects the final settling tank 13 and the treatment tank 12, and returns activated sludge from the final settling tank 13 to the treatment tank 12. Each of the blower 14 and the pump 15 is an example of the control target device described above. Hereinafter, when no distinction is made between the blower 14 and the pump 15, they can be collectively referred to as a control target device.

The water treatment plant 100 is equipped with the sensor 2 including a plurality of sensors $20_1$ to $20_m$ that each detect the water treatment environment of the water treatment apparatus 1. Each of the sensors $20_1$ to $20_m$ detects, for example, a characteristic indicating the internal state or environment of the water treatment apparatus 1. Specifically, the sensors $20_1$ to $20_4$ detect inflow water characteristics that are characteristics of inflow water into the primary settling tank 11. The sensor $20_1$ detects the inflow amount of inflow water. The sensor $20_2$ detects the biochemical oxygen demand (BOD) of inflow water. The sensor $20_3$ detects the temperature of inflow water. The sensor $20_4$ detects the concentration of $NH_3$ in inflow water, the concentration of $NH_4^+$ in inflow water, or the concentration of ammoniacal nitrogen.

The sensors $20_5$ to $20_{m-3}$ detect in-treatment-tank characteristics indicating the state of the treatment tank 12. The sensor $20_5$ detects the amount of dissolved oxygen in the treatment tank 12. The sensor $20_6$ detects the concentration of active microorganisms in the treatment tank 12. The sensor $20_7$ detects a BOD in the treatment tank 12. The sensors $20_8$ to $20_{m-3}$ include, for example, a plurality of sensors that detect the concentration of ammoniacal nitrogen, the concentration of nitrate nitrogen, the concentration of total nitrogen, the concentration of phosphoric acid phosphorus, and the concentration of total phosphorus.

The sensors $20_{m-2}$ to $20_m$ detect treated water characteristics that are characteristics of treated water discharged from the final settling tank 13. The sensor $20_{m-2}$ detects the outflow amount of treated water. The sensor $20_{m-1}$ detects the BOD of treated water. The sensor $20_m$ detects the concentration of total nitrogen in treated water.

Note that the sensor 2 may be configured such that it does not include one or more of the sensors $20_1$ to $20_m$. The sensors $20_1$ to $20_m$ described above detect characteristic values indicating the internal state of the water treatment apparatus 1, but the sensor 2 may include an imaging device that outputs imaging data as detection data.

Figure 3:
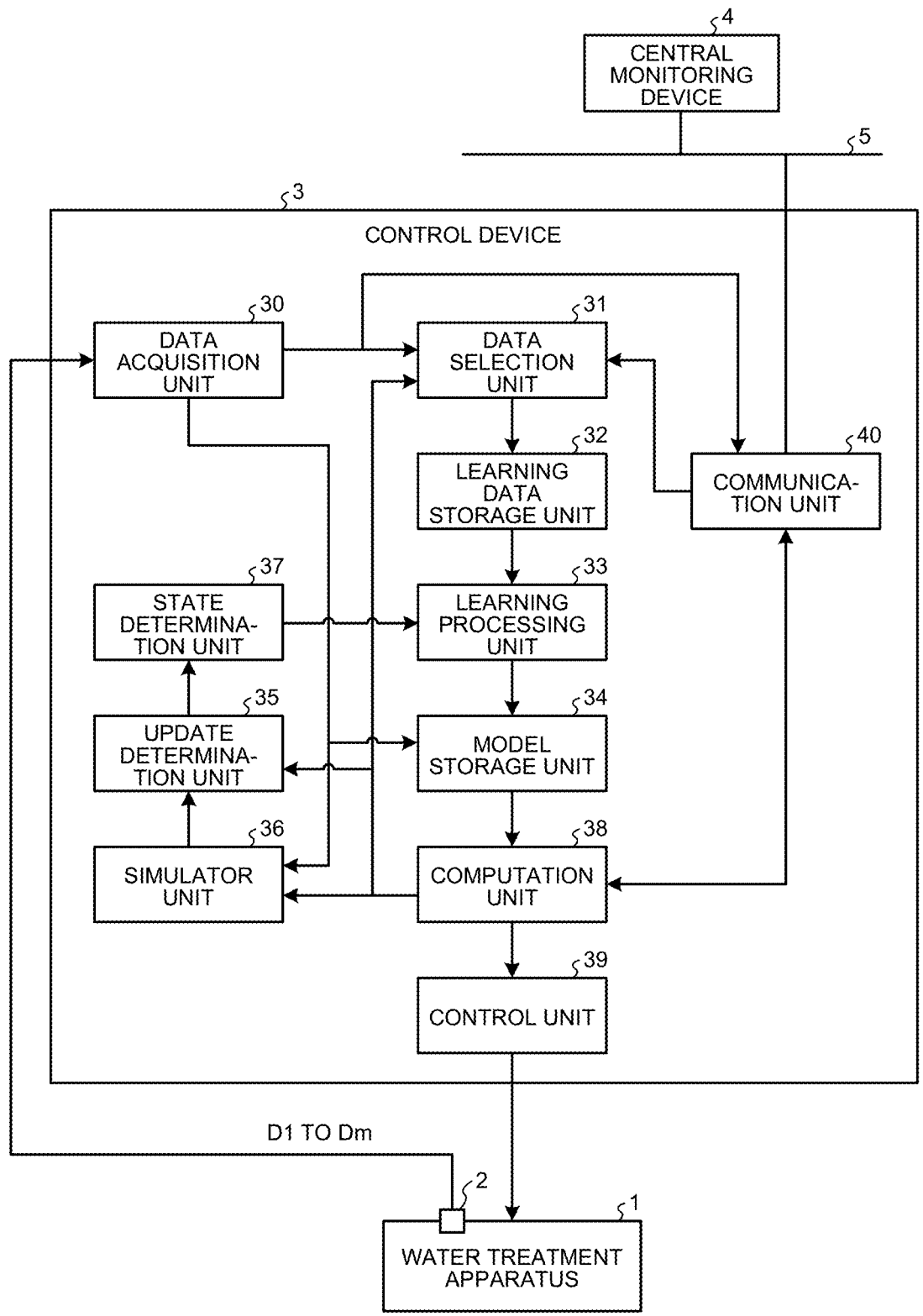
FIG. 3 is a diagram illustrating an exemplary configuration of a control device according to the first embodiment.

FIG. 3 is a diagram illustrating an exemplary configuration of the control device according to the first embodiment.

As illustrated in FIG. 3, the control device 3 according to the first embodiment includes a data acquisition unit 30, a data selection unit 31, a learning data storage unit 32, a learning processing unit 33, a model storage unit 34, an update determination unit 35, a simulator unit 36, a state determination unit 37, the computation unit 38, the control unit 39, and a communication unit 40. The learning processing unit 33, the model storage unit 34, and the computation unit 38 are examples of AI.

The data acquisition unit 30 acquires detection data from the sensor 2. The sensor 2 includes the plurality of sensors $20_1$ to $20_m$ as described above, and the data acquisition unit 30 periodically acquires detection data output from the plurality of sensors $20_1$ to $20_m$.

The data selection unit 31 selects, from among the detection data acquired by the data acquisition unit 30, detection data that satisfy a preset data selection condition, and stores the selected detection data in the learning data storage unit 32.

The data selection condition is, for example, to select detection data suitable for the generation and update of a calculation model. Detection data suitable for the generation and update of a calculation model are, for example, detection data output from the sensor 2 in a state where the environment of the area including the water treatment plant 100 satisfies set environmental conditions. Environmental conditions are, for example, that the weather is not heavy rain, no river is flooded, and no water supply is interrupted in the area including the water treatment plant 100. Environmental conditions may also include that there is no typhoon and that it is not the rainy season.

Environmental information indicating the environment of the area including the water treatment plant 100 is provided to the data selection unit 31 from the central monitoring device 4 via the communication network 5 and the communication unit 40, for example. Based on the environmental information provided from the central monitoring device 4, the data selection unit 31 selects, from among the detection data acquired by the data acquisition unit 30, detection data that satisfy the preset data selection condition.

The data selection condition may be that detection data output from the sensor 2 are within a set range. In this case, the set range is a range suitable for the generation and update of a calculation model, and is set to exclude, for example, detection data indicating numerical values that do not appear during normal operation of the water treatment plant 100. The data selection unit 31 selects the detection data within the set range and does not select the detection data outside the set range. This enables the learning data storage unit 32 to store only the detection data within the preset range.

Note that the data selection condition can be set from the central monitoring device 4. By operating the central monitoring device 4, the operator of the water treatment plant 100 can transmit information on the data selection condition from the central monitoring device 4 to the control device 3. The data selection unit 31 acquires, from the communication unit 40, the information on the data selection condition transmitted from the central monitoring device 4, and detects detection data based on the information on the data selection condition acquired.

The data selection unit 31 can also select detection data using a preset time range as one unit. For example, the data selection unit 31 can determine whether detection data satisfy the selection condition on an hourly or daily basis. In this case, for example, the data selection unit 31 can temporarily store detection data in the learning data storage unit 32, and then delete, from the learning data storage unit 32, the hourly- or daily-basis detection data including detection data that do not satisfy the selection condition.

The data selection unit 31 can also cause the learning data storage unit 32 to store, together with the detection data that satisfy the selection condition, information on a control target value for a control target device that is controlled by the control unit 39 based on the detection data that satisfy the selection condition, in association with the detection data that satisfy the selection condition.

The learning data storage unit 32 stores, as learning data, the detection data selected by the data selection unit 31 and information on a control target value for a control target device that is controlled by the control unit 39 based on the detection data that satisfy the selection condition in association with each other.

Figures 4, 5:
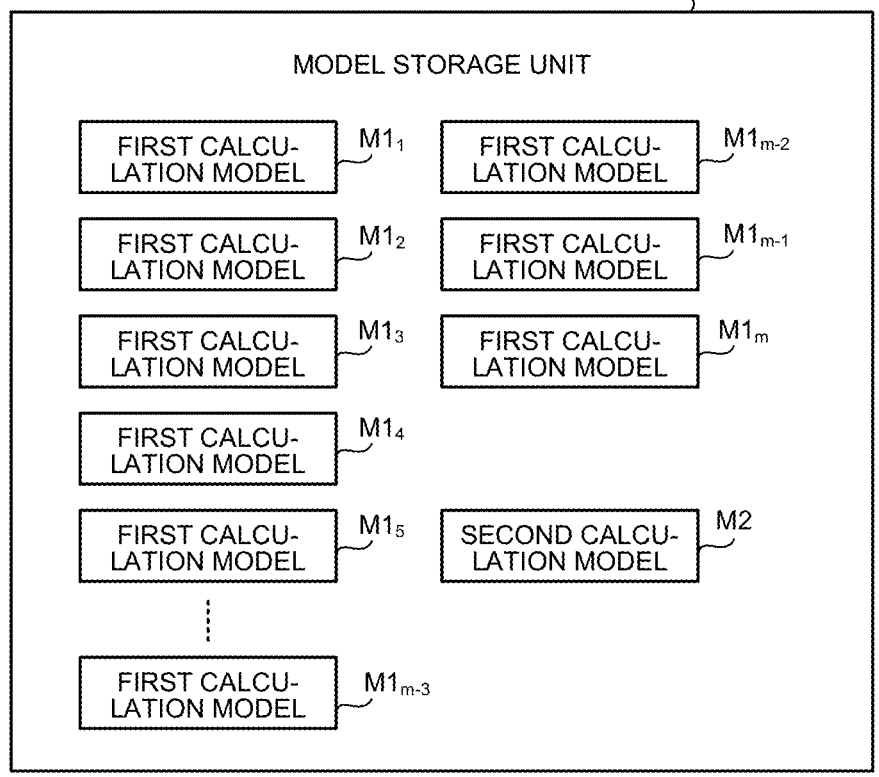
FIG. 4 is a diagram illustrating an example of a data table stored in a learning data storage unit according to the first embodiment.
FIG. 5 is a diagram illustrating an example of information stored in a model storage unit according to the first embodiment.

FIG. 4 is a diagram illustrating an example of a data table stored in the learning data storage unit according to the first embodiment. The data table illustrated in FIG. 4 is a data table including time-slot- or daily-basis detection data. Note that the data table stored in the learning data storage unit 32 is not limited to the data table including detection data for each time slot or each day. For example, the data table stored in the learning data storage unit 32 may be a data table including monthly- or annual-basis detection data.

The data table illustrated in FIG. 4 includes detection data and control target values for each time. In FIG. 4, detection data $D1(t0), D1(t1), \ldots,$ and $D1(tp)$ are detection data from the sensor $20_1$, and include a measured value Da1 of the flow rate of inflow water detected by the sensor $20_1$. The detection data $D2(t0), D2(t1), \ldots,$ and $D2(tp)$ are detection data from the sensor $20_2$, and include a measured value Da2 of the BOD of inflow water detected by the sensor $20_2$. The detection data $D3(t0), D3(t1), \ldots,$ and $D3(tp)$ are detection data from the sensor $20_3$, and include a measured value Da3 of the temperature of inflow water detected by the sensor $20_3$.

The detection data $D4(t0), D4(t1), \ldots,$ and $D4(tp)$ are detection data from the sensor $20_4$, and include a measured value Da4 of $NH_3$ in inflow water detected by the sensor $20_4$. The detection data $Dm(t0), Dm(t1), \ldots,$ and $Dm(tp)$ are detection data from the sensor $20_m$, and include a measured value Dam of the concentration of total nitrogen in treated water detected by the sensor $20_m$. Here, reference character "p" is, for example, an integer of three or more.

The detection data $D1(t0), D2(t0), D3(t0), D4(t0), \ldots,$ and $Dm(t0)$ are data that constitute $D(t0)$ output from the sensor 2 at time t0. The detection data $D1(t1), D2(t1), D3(t1), D4(t1), \ldots,$ and $Dm(t1)$ are data that constitute $D(t1)$ output from the sensor 2 at time t1.

The detection data $D1(tp), D2(tp), D3(tp), D4(tp), \ldots,$ and $Dm(tp)$ are data that constitute $D(tp)$ output from the sensor 2 at time tp. Hereinafter, when no distinction is made between the detection data $D(t0), D(t1), \ldots,$ and $D(tp)$ output from the sensor 2, they can be collectively referred to as the detection data D. When no distinction is made between the measured values Da1 to Dam respectively included in the detection data D1 to Dm, they can be collectively referred to as the measured value Da.

The data table illustrated in FIG. 4 also includes information on the control target value for each control target device output from the computation unit 38 to the control unit 39 at each time. In FIG. 4, control target values $RV1(t0), RV1(t1), \ldots,$ and $RV1(tp)$ are control target values for the blower 14. Control target values $RV2(t0), RV2(t1), \ldots,$ and $RV2(tp)$ are control target values for the pump 15.

Hereinafter, when no distinction is made between the control target values $RV1(t0), RV1(t1), \ldots,$ and $RV1(tp)$, they can be collectively referred to as the control target value RV1, and when no distinction is made between the control target values $RV2(t0), RV2(t1), \ldots,$ and $RV2(tp)$, they can be collectively referred to as the control target value RV2. When no distinction is made between the control target values RV1 and RV2, they can be collectively referred to as the control target value RV.

Let us now return to FIG. 3 to continue the explanation of the control device 3. The learning processing unit 33 generates and updates a calculation model for use in the computation unit 38 based on the information stored in the learning data storage unit 32. The calculation model is a neural network, but may be a calculation model generated by a learning algorithm such as linear regression or logistic regression.

The learning processing unit 33 can execute the learning processes for multiple types of calculation models. Through the learning process for a calculation model, the calculation model is generated and updated. For example, the learning processing unit 33 can execute the generation and update of a plurality of first calculation models $M1_1$ to $M1_m$ and a second calculation model M2.

Each of the plurality of first calculation models $M1_1$ to $M1_m$ is a calculation model that receives input of detection data output from the sensor 2 and outputs information on a predicted value of the internal state of the water treatment apparatus 1. The second calculation model M2 is a calculation model that receives input of detection data output from the sensor 2 and outputs information on the control target values RV1 and RV2 for the plurality of control target devices.

Note that, hereinafter, when no distinction is made between the first calculation models $M1_1$ to $M1_m$, they can be collectively referred to as the first calculation model M1. When no distinction is made between the first calculation model M1 and the second calculation model M2, they can be collectively referred to as the calculation model M. Note that the update of the calculation model M is the regeneration of the calculation model M, and hereinafter, the generation and update of the calculation model M can be collectively referred to as the generation of the calculation model M.

The learning processing unit 33 can generate the first calculation model M1 using time-series detection data output from the sensor 2. For example, the learning processing unit 33 can generate the first calculation model $M1_1$ using the time-series detection data $D1(t0), D1(t1), \ldots,$ and $D1(tp)$ stored in the learning data storage unit 32. The first calculation model $M1_1$ is a calculation model that receives input of time-series detection data output from the sensor $20_1$ and outputs the data of a predicted value F1 of the future inflow rate of inflow water. Note that future means a period of time Ta after the present time. The period of time Ta can be freely set.

The learning processing unit 33 can also generate the first calculation model $M1_2$ using the time-series detection data $D2(t0), D2(t1), \ldots,$ and $D2(tp)$ stored in the learning data storage unit 32. The first calculation model $M1_2$ is a calculation model that receives input of time-series detection data output from the sensor $20_2$ and outputs the data of a predicted value F2 of the BOD of inflow water after the period of time Ta.

The learning processing unit 33 can also generate the first calculation model $M1_3$ using the time-series detection data $D3(t0), D3(t1), \ldots,$ and $D3(tp)$ stored in the learning data storage unit 32. The first calculation model $M1_3$ is a calculation model that receives input of time-series detection data output from the sensor $20_3$ and outputs the data of a predicted value F3 of the temperature of inflow water after the period of time Ta.

The learning processing unit 33 can also generate the first calculation model $M1_4$ using the time-series detection data D4(t0), D4(t1), . . . , and D4(tp) stored in the learning data storage unit 32. The first calculation model $M1_4$ is a calculation model that receives input of time-series detection data output from the sensor 204 and outputs the data of a predicted value F4 of the $NH_3$ of inflow water after the period of time Ta.

Similarly, the learning processing unit 33 can generate the first calculation models $M1_5$ to $M1_m$ that respectively output predicted values F5 to Fm after the period of time Ta using time-series detection data output from the sensors $20_5$ to $20_m$ and stored in the learning data storage unit 32, respectively. Note that the first calculation model M1 is, for example, a convolutional neural network or a recurrent neural network. Hereinafter, when no distinction is made between the predicted values F1 to Fm, they can be collectively referred to as the predicted value F.

In the example described above, the learning processing unit 33 generates the first calculation model M1 using only the past measured value Da of the characteristic to be predicted. Alternatively, the learning processing unit 33 can generate the first calculation model M1 using the measured value Da of a characteristic other than the past measured value Da of the characteristic to be predicted and the control target value RV. For example, the learning processing unit 33 can generate the first calculation models $M1_5$ to $M1_m$ using the time-series detection data D1(t0) to D1(tp), D2(t0) to D2(tp), D3(t0) to D3(tp), and D4(t0) to D4(tp) and the time-series control target values RV1 and RV2 used by the control unit 39. The first calculation model $M1_5$ is, for example, a calculation model that receives input of time-series detection data output from the sensors $20_1$ to $20_4$ and the time-series control target values RV1 and RV2 and outputs the data of the predicted values F5 to Fm after the period of time Ta.

Note that the first calculation model M1 only needs to be able to output the predicted values F1 to Fm based on the time-series detection data D, and is not limited to the example described above. For example, each of the first calculation models $M1_1$ to $M1_m$ may be a calculation model that receives input of the time-series detection data D1 to Dm and the time-series control target values RV1 and RV2 and outputs the data of the predicted values F1 to Fm.

Note that the first calculation model M1 only needs to be able to output the predicted values F1 to Fm based on the time-series detection data D, and is not limited to the example described above. For example, each of the first calculation models $M1_1$ to $M1_m$ may be a calculation model that receives input of the time-series detection data D1 to Dm and the time-series control target values VR1 and VR2 and outputs the data of the predicted values F1 to Fm.

The learning processing unit 33 can also generate the second calculation model M2 using, as learning data, the detection data D and the control target values RV1 and RV2 stored in the learning data storage unit 32. The second calculation model M2 is, for example, a calculation model that receives input of detection data output from the sensors $20_1$ to $20_m$ and outputs the control target values RV1 and RV2 for the plurality of control target devices.

The learning processing unit 33 stores the generated calculation model M in the model storage unit 34. FIG. 5 is a diagram illustrating an example of information stored in the model storage unit according to the first embodiment. In the example illustrated in FIG. 5, the plurality of first calculation models $M1_1$, $M1_2$, $M1_3$, $M1_4$, $M1_5$, . . . , $M1_{m-3}$, $M1_{m-2}$, $M1_{m-1}$, and $M1_m$ and the second calculation model M2 are stored in the model storage unit 34.

Let us now return to FIG. 3 to continue the explanation of the control device 3. The update determination unit 35 determines, based on the result of computation with the calculation model M by the computation unit 38, whether the calculation model M for use in the computation unit 38 needs to be updated. For example, the update determination unit 35 can determine whether the first calculation model M1 needs to be updated based on the difference between the state of the water treatment apparatus 1 predicted by the first calculation model M1 and the state of the water treatment apparatus 1 detected by the sensor 2.

For example, the update determination unit 35 computes the difference between the predicted value F1 of the flow rate of inflow water computed by the computation unit 38 using the first calculation model $M1_1$ that makes a future prediction of the flow rate of inflow water and the measured value Da1 of the flow rate of inflow water detected by the sensor 2 after the period of time Ta. The update determination unit 35 determines whether the difference between the predicted value F1 and the measured value Da1 is equal to or greater than a threshold Vth1, and when the difference between the predicted value F1 and the measured value Da1 is equal to or greater than the threshold Vth1, determines that the first calculation model $M1_1$ needs to be updated. The update determination unit 35 determines that the first calculation model $M1_1$ need not be updated when the difference between the predicted value F1 and the measured value Da1 is less than the threshold Vth1.

Instead of determining whether the difference between the predicted value F1 and the measured value Da1 is equal to or greater than the threshold Vth1, the update determination unit 35 can determine whether the moving average of the difference between the predicted value F1 and the measured value Da1 is equal to or greater than a threshold Vth2. In this case, the update determination unit 35 determines that the first calculation model $M1_1$ needs to be updated when the moving average of the difference between the predicted value F1 and the measured value Da1 is equal to or greater than the threshold Vth2. The update determination unit 35 determines that the first calculation model $M1_1$ need not be updated when the moving average of the difference between the predicted value F1 and the measured value Da1 is less than the threshold Vth2.

Similarly, the update determination unit 35 can determine whether each of the first calculation models $M1_2$ to $M1_m$ needs to be updated through the process similar to that in the case of the first calculation model $M1_1$. Note that the update determination unit 35 can determine that the plurality of first calculation models M1 need to be updated, for example, when the total value of the differences between the predicted values F and the measured values Da in the plurality of first calculation models M1 is equal to or greater than a threshold.

The update determination unit 35 can determine that the plurality of first calculation models M1 need to be updated when the moving average of the total value of the differences between the predicted values F and the measured values Da in the plurality of first calculation models M1 is equal to or greater than a threshold. For example, the update determination unit 35 can determine that the plurality of first calculation models $M1_1$ to $M1_4$ need to be updated when the moving average of the total value of the differences between the predicted values F and the measured values Da in the plurality of first calculation models $M1_1$ to $M1_4$ is equal to or greater than a threshold.

The update determination unit 35 can also determine the accuracy of prediction by the first calculation model M1 based on the result of computation in the simulator unit 36, and determine that the first calculation model M1 needs to be updated based on the result of determination.

The simulator unit 36 is, for example, an activated sludge model simulator that performs computations with an activated sludge model to simulate physical, biological, and scientific behavior in water treatment. The activated sludge model is a model that mathematically describes biological reaction processes, water quality changes in terms of mass balance, and the like, published by, for example, the International Water Association (IWA). The simulator unit 36 can predict in-treatment-tank characteristics and treated water characteristics from the detection data D output from the sensor 2, for example, through computation with the activated sludge model.

The update determination unit 35 can determine that each of the first calculation models $M1_5$ to $M1_{m-3}$ needs to be updated by comparing the predicted values of in-treatment-tank characteristics computed by the simulator unit 36 with the predicted values F4 to Fm-3 computed by the computation unit 38 using the first calculation models $M1_5$ to $M1_{m-3}$. For example, the update determination unit 35 computes the difference ΔF5 between the predicted value of the amount of dissolved oxygen computed by the simulator unit 36 and the predicted value F5 of the amount of dissolved oxygen computed by the computation unit 38 using the first calculation model $M1_5$. The update determination unit 35 can determine that the first calculation model $M1_5$ needs to be updated when the computed difference ΔF5 is equal to or greater than a threshold Vth3 or when the moving average value of the computed difference ΔF5 is equal to or greater than the threshold Vth3.

Similarly, the update determination unit 35 can determine that each of the first calculation models $M1_{m-2}$, $M1_{m-1}$, and $M1_m$ needs to be updated by comparing the predicted values of treated water characteristics computed by the simulator unit 36 with the predicted values Fm-2, Fm-1, and Fm computed by the computation unit 38 using the first calculation models $M1_{m-2}$, $M1_{m-1}$, and $M1_m$.

The update determination unit 35 can also determine that the second calculation model M2 needs to be updated based on the control target values RV1 and RV2 obtained through computation with the second calculation model M2 by the computation unit 38. For example, the update determination unit 35 determines whether the control target values RV1 and RV2 computed by the computation unit 38 using the second calculation model M2 are within a preset range Rth. In response to determining that the control target values RV1 and RV2 computed by the computation unit 38 are not within the preset range Rth, the update determination unit 35 determines that the second calculation model M2 needs to be updated.

The update determination unit 35 can also compute the control target value RV from the detection data D output from the sensor 2 using the activated sludge model. The update determination unit 35 computes the difference ΔRV between the control target value RV obtained with the activated sludge model and the control target value RV obtained through computation with the second calculation model M2 by the computation unit 38. The update determination unit 35 determines that the second calculation model M2 needs to be updated when the difference ΔRV is equal to or greater than a threshold RVth or when the moving average value of the difference ΔRV is equal to or greater than the threshold RVth.

In the example described above, the update determination unit 35 determines whether the calculation model M for use in the computation unit 38 needs to be updated based on the result of computation with the calculation model M by the computation unit 38. However, the determination of the necessity of updating the calculation model M is not limited to the example described above. For example, the update determination unit 35 can also determine that the calculation model M for use in the computation unit 38 needs to be updated at preset intervals.

In response to the update determination unit 35 determining that the calculation model M needs to be updated, the state determination unit 37 determines whether a learning process by the learning processing unit 33 is possible based on the load state of the computing resource used for the learning process by the learning processing unit 33. In a case where the computing resource used for a learning process by the learning processing unit 33 in the control device 3 is a central processing unit (CPU), the load state of the computing resource is the load state of the CPU, for example, the usage rate of the CPU.

In a case where the computing resource is a CPU, the state determination unit 37 determines that a learning process by the learning processing unit 33 is possible, for example, when the usage rate of the CPU is less than a threshold Rth1. The state determination unit 37 determines that a learning process by the learning processing unit 33 is not possible, for example, when the usage rate of the CPU is equal to or greater than the threshold Rth1.

The learning processing unit 33 executes a learning process based on the result of determination by the state determination unit 37. For example, in response to the state determination unit 37 determining that a learning process by the learning processing unit 33 is possible, the learning processing unit 33 performs the learning process. In response to the state determination unit 37 determining that a learning process by the learning processing unit 33 is not possible, the learning processing unit 33 does not perform the learning process.

The state determination unit 37 also determines whether the load state of the computing resource satisfies a preset stop condition during the execution of the learning process by the learning processing unit 33. In a case where the computing resource is a CPU, the state determination unit 37 determines that the stop condition is satisfied, for example, when the usage rate of the CPU is equal to or greater than a threshold Rth2. Note that the threshold Rth2 is, for example, a value smaller than the threshold Rth1.

The state determination unit 37 also determines whether the load state of the computing resource satisfies a preset restart condition during the suspension of the learning process by the learning processing unit 33. In a case where the computing resource is a CPU, the state determination unit 37 determines that the restart condition is satisfied, for example, when the usage rate of the CPU is less than a threshold Rth3. The threshold Rth3 is, for example, a value smaller than the threshold Rth2.

The learning processing unit 33 stops the execution of the learning process in response to the state determination unit 37 determining that the load state of the computing resource satisfies the stop condition during the execution of the learning process. The learning processing unit 33 restarts the execution of the learning process in response to the state determination unit 37 determining that the load state of the computing resource satisfies the restart condition during the suspension of the learning process.

In the example described above, the state determination unit 37 determines whether a learning process by the learning processing unit 33 is possible in response to the update determination unit 35 determining that the calculation model M needs to be updated. However, the determination as to whether a learning process is possible is not limited to the example described above. For example, the state determination unit 37 can determine whether a learning process by the learning processing unit 33 is possible regardless of whether the update determination unit 35 determines that the calculation model M needs to be updated. In this case, the control device 3 may not necessarily include the update determination unit 35. In addition, the control device 3 may not necessarily include the state determination unit 37. In this case, the learning processing unit 33 performs a learning process in response to the update determination unit 35 determining that the calculation model M needs to be updated.

The computation unit 38 has a first mode and a second mode as its operation mode. When the operation mode is set to the first mode, the computation unit 38 performs computation with the first calculation model M1. When the operation mode is set to the second mode, the computation unit 38 performs computation with the second calculation model M2.

By operating the central monitoring device 4, the operator of the water treatment plant 100 can transmit information on the operation mode of the computation unit 38 from the central monitoring device 4 to the control device 3. The computation unit 38 can acquire, from the communication unit 40, the information on the operation mode transmitted from the central monitoring device 4, and perform computation with the calculation model M in either operation mode of the first mode and the second mode based on the information on the operation mode acquired.

First, the first mode will be described. When the operation mode is set to the first mode, the computation unit 38 acquires the time-series detection data D from the sensor 2 acquired by the data acquisition unit 30. The computation unit 38 performs computation with the plurality of first calculation models $M1_1$ to $M1_m$ that receive input of the acquired time-series detection data D, and acquires the predicted values F1 to Fm output from the first calculation models $M1_1$ to $M1_m$.

For example, the computation unit 38 performs computation with the first calculation model $M1_1$ that receives input of the time-series detection data D1 output from the sensor $20_1$, and acquires the predicted value F1 of the flow rate of inflow water as the output of the first calculation model $M1_1$. The computation unit 38 also performs computation with the first calculation model $M1_2$ that receives input of the time-series detection data D2 output from the sensor $20_2$, and acquires the predicted value F2 of the BOD of inflow water as the output of the first calculation model $M1_2$.

Similarly, the computation unit 38 performs computation with the first calculation model $M1_3$ that receives input of the time-series detection data D3 output from the sensor $20_3$, and acquires the predicted value F3 of the temperature of inflow water as the output of the first calculation model $M1_3$. The computation unit 38 also performs computation with the first calculation model $M1_4$ that receives input of the time-series detection data D4 output from the sensor $20_4$, and acquires the predicted value F4 of $NH_3$ in inflow water as the output of the first calculation model $M1_4$.

The computation unit 38 computes the control target values RV1 and RV2 for the control target devices based on the predicted values F1 to Fm obtained through the computation with the first calculation models $M1_1$ to $M1_m$, and outputs the computed control target values RV1 and RV2 to the control unit 39. For example, the computation unit 38 can compute the control target values RV1 and RV2 from the predicted values F1 to Fm using a calculation model that receives input of the predicted values F1 to Fm and outputs the control target values RV1 and RV2. Such a calculation model can be generated and updated by the learning processing unit 33 based on the data stored in the learning data storage unit 32, for example. In a case where the first calculation models $M1_1$ to $M1_m$ are recurrent neural networks, the computation unit 38 can obtain the predicted values F1 to Fm each time the data acquisition unit 30 acquires the newly acquired detection data D.

Next, the second mode will be described. When the operation mode is set to the second mode, the computation unit 38 acquires the detection data D from the sensor 2 acquired by the data acquisition unit 30. The computation unit 38 inputs the acquired time-series detection data D to the second calculation model M2 and performs computation with the second calculation model M2, thereby acquiring the control target values RV1 and RV2 output from the second calculation model M2. The computation unit 38 outputs, to the control unit 39, the control target values RV1 and RV2 obtained through the computation with the second calculation model M2.

The above-mentioned neural network is an artificial neural network. The artificial neural network is a calculation model in which perceptrons are hierarchically arranged, each taking a weighted sum of input signals and applying a non-linear function called an activation function to produce an output. The output out of a perceptron can be expressed by Formula (1) below, where X=(x1, x2, ... , and xn) is inputs, W=(w1, w2, ... , and wn) is weights, f(·) is an activation function, and * is the element-wise product of vectors.

$$\text{out} = f(X * W) \tag{1}$$

In a convolutional neural network, a perceptron takes two-dimensional signals corresponding to an image as inputs, calculates a weighted sum of the inputs, and passes the weighted sum to the next layer. A sigmoid function or a rectified linear unit (ReLU) function is used as the activation function.

The above-mentioned perceptrons are hierarchically arranged in the artificial neural network, and input signals are processed in each layer, whereby the result of identification is calculated. In the last layer, for example, if the task type in the artificial neural network is a regression task, the output of the activation function is directly used as the output of the task, and if the task type is a classification task, the softmax function is applied to the last layer to produce the output of the task.

In the case of the convolutional neural network, an artificial network is constructed as a map of two-dimensional signals. Each of the two-dimensional signals, which can be considered as corresponding to a perceptron, calculates a weighted sum for the feature map of the previous layer, and applies the activation function to produce the result as an output.

In the convolutional neural network, the above-mentioned processing is called convolution computation, which can also include a pooling layer inserted in each layer for performing pooling processing. The pooling layer performs downsampling by performing average value computation or maximum value computation on the feature map.

Learning of such an artificial neural network is performed by backpropagation using, for example, a known stochastic gradient descent method. Backpropagation is a framework in which the output error of the artificial neural network is propagated in order from the last layer to the preceding layers so that weights are updated.

Next, the control unit 39 illustrated in FIGS. 1 and 3 will be described. The control unit 39 can control the water treatment apparatus 1 by controlling the blower 14, the pump 15, and the like. For example, the control unit 39 can control the concentration of dissolved oxygen in the activated sludge mixture by controlling the blower 14 to adjust the amount of air to be sent into the activated sludge mixture. The control unit 39 also adjusts the flow rate of the activated sludge to be returned from the final settling tank 13 to the treatment tank 12 by controlling the pump 15.

Figure 6:
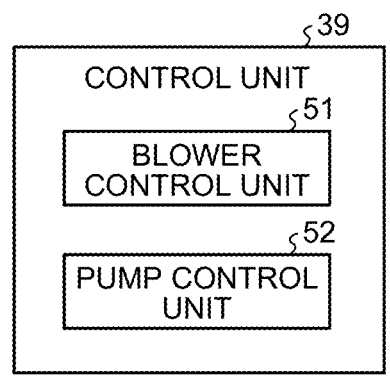
FIG. 6 is a diagram illustrating an exemplary configuration of a control unit of the control device according to the first embodiment.

The control unit 39 controls the blower 14 of the water treatment apparatus 1 based on the control target value RV1 output from the computation unit 38. The control unit 39 also controls the pump 15 of the water treatment apparatus 1 based on the control target value RV2 output from the computation unit 38. FIG. 6 is a diagram illustrating an exemplary configuration of the control unit of the control device according to the first embodiment. As illustrated in FIG. 6, the control unit 39 includes a blower control unit 51 and a pump control unit 52.

The blower control unit 51 acquires the control target value RV1 output from the computation unit 38. The blower control unit 51 also acquires, from the sensor $20_5$, numerical data indicating the amount of dissolved oxygen detected by the sensor $20_5$. The blower control unit 51 generates a control signal by proportional integral (PI) control or proportional integral differential (PID) control based on the control target value RV1 for the blower 14 and the amount of dissolved oxygen acquired. The blower control unit 51 outputs the generated control signal to the blower 14. The blower 14 adjusts the amount of air to be sent to the treatment tank 12 based on the control signal output from the blower control unit 51.

The pump control unit 52 acquires the control target value RV2 output from the computation unit 38. The pump control unit 52 also acquires, from a sensor that detects the flow rate of activated sludge, numerical data indicating the flow rate of activated sludge from the final settling tank 13 to the treatment tank 12. The pump control unit 52 generates a control signal by PI control or PID control based on the control target value RV2 for the pump 15 and the flow rate of activated sludge acquired. The pump control unit 52 outputs the generated control signal to the pump 15. The pump 15 adjusts the flow rate of activated sludge from the final settling tank 13 to the treatment tank 12 based on the control signal output from the pump control unit 52.

The communication unit 40 outputs, to the central monitoring device 4, the detection data D acquired by the data acquisition unit 30, the control target values RV1 and RV2 computed by the computation unit 38, and the like. The central monitoring device 4 displays, on a display unit (not illustrated), the detection data D, the control target values RV1 and RV2, and the like transmitted from the communication unit 40. Consequently, the operator of the water treatment plant 100 can monitor the state of the water treatment apparatus 1 and the state of water treatment control by the control device 3.

Figure 7:
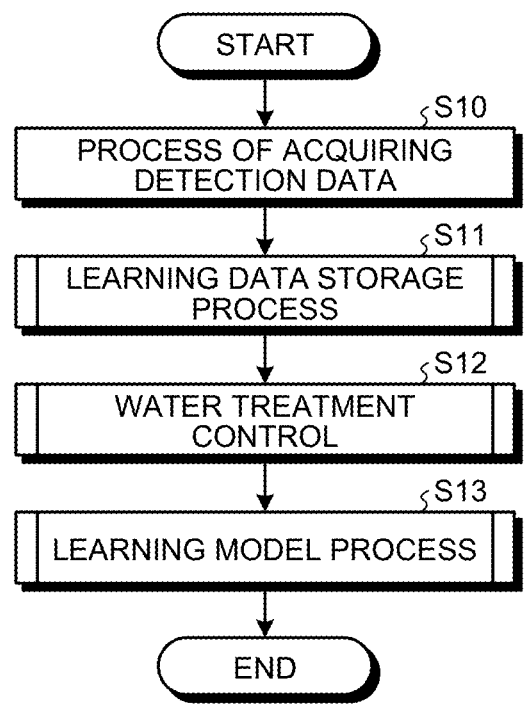
FIG. 7 is a flowchart illustrating an exemplary procedure that is performed by the control device according to the first embodiment.

Next, the operation of the control device 3 will be described using flowcharts. FIG. 7 is a flowchart illustrating an exemplary procedure that is performed by the control device according to the first embodiment, which is repeatedly executed by the control device 3.

As illustrated in FIG. 7, the data acquisition unit 30 of the control device 3 executes a process of acquiring the detection data D from the sensor 2 (step S10). Next, the control device 3 executes a learning data storage process (step S11). Step S11 corresponds to steps S20 and S21 illustrated in FIG. 8 and will be described in detail later.

Next, the control device 3 executes a water treatment control (step S12). Step S12 corresponds to steps S30 to S33 illustrated in FIG. 9 and will be described in detail later. The control device 3 then executes a learning model process (step S13). Step S13 corresponds to steps S40 to S48 illustrated in FIG. 10 and will be described in detail later.

After step S13, the control device 3 ends the procedure illustrated in FIG. 7. Note that the order of steps S11, S12, and S13 is not limited to the order described above. The control device 3 can also execute steps S11, S12, and S13 in parallel. The control device 3 can also perform step S13 with a longer cycle than steps S11 and S12.

Figure 8:
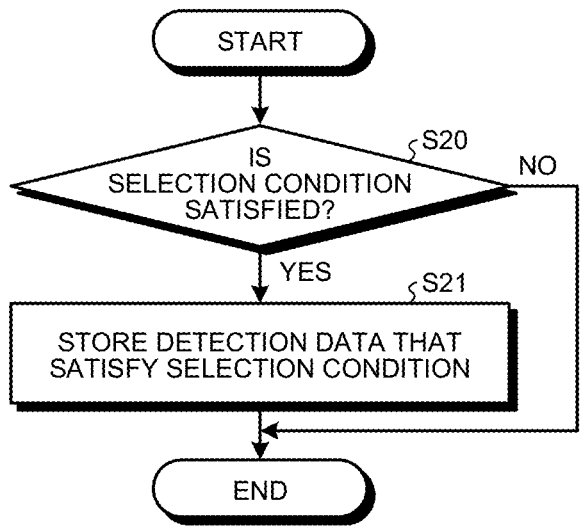
FIG. 8 is a flowchart illustrating an exemplary learning data storage process that is performed by the control device according to the first embodiment.

FIG. 8 is a flowchart illustrating an exemplary learning data storage process that is performed by the control device according to the first embodiment. As illustrated in FIG. 8, the data selection unit 31 of the control device 3 determines whether the detection data D satisfy the set selection condition (step S20). In response to determining that the detection data D satisfy the selection condition (step S20: Yes), the data selection unit 31 stores the detection data D that satisfy the selection condition in the learning data storage unit 32 (step S21).

After step S21 or in response to determining that the detection data D do not satisfy the set selection condition (step S20: No), the data selection unit 31 ends the process illustrated in FIG. 8.

Figure 9:
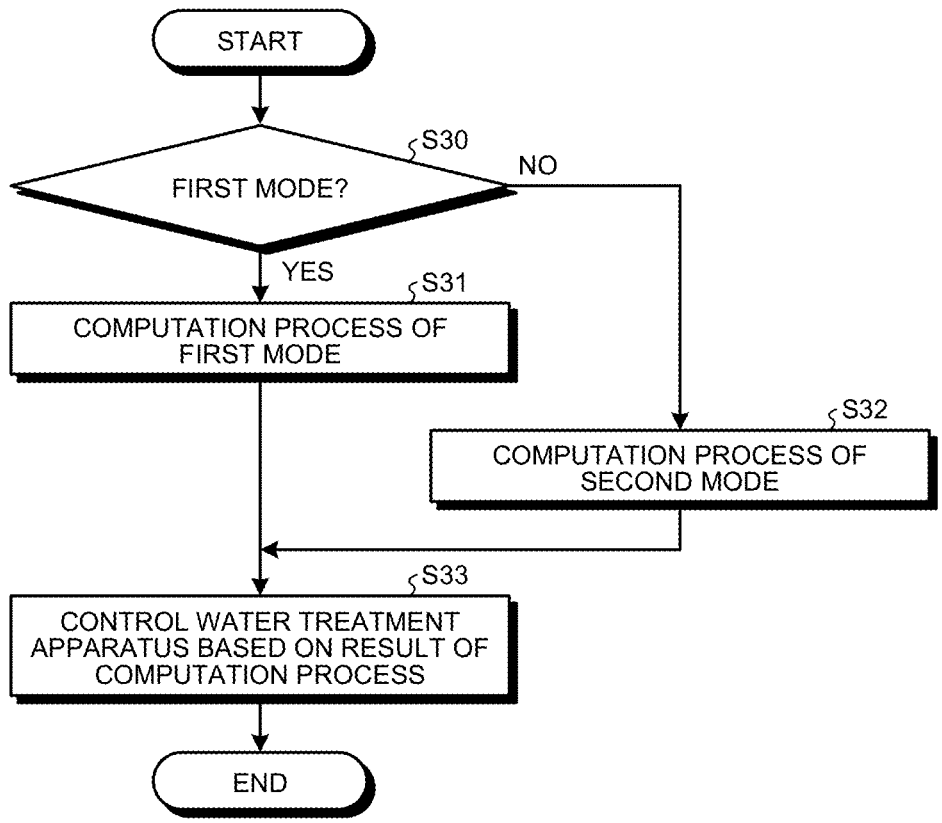
FIG. 9 is a flowchart illustrating an exemplary water treatment control that is performed by the control device according to the first embodiment.

FIG. 9 is a flowchart illustrating an exemplary water treatment control that is performed by the control device according to the first embodiment. As illustrated in FIG. 9, the computation unit 38 of the control device 3 determines whether the operation mode is set to the first mode (step S30). In response to determining that the operation mode is set to the first mode (step S30: Yes), the computation unit 38 performs the computation process of the first mode (step S31). The computation process of the first mode is a process of obtaining the control target values RV1 and RV2 based on the computation with the plurality of first calculation models M1 described above.

In response to determining that the operation mode is not set to the first mode (step S30: No), the computation unit 38 performs the computation process of the second mode (step S32). The computation process of the second mode is a process of obtaining the control target values RV1 and RV2 based on the computation with the second calculation model M2 described above.

The control unit 39 controls the water treatment apparatus 1 based on the result of the computation process by the computation unit 38 (step S33). In step S33, the control unit 39 controls the blower 14 and the pump 15 of the water treatment apparatus 1 based on the control target values RV1 and RV2 obtained by the computation unit 38. After step S33, the control unit 39 ends the process illustrated in FIG. 9.

Figure 10:
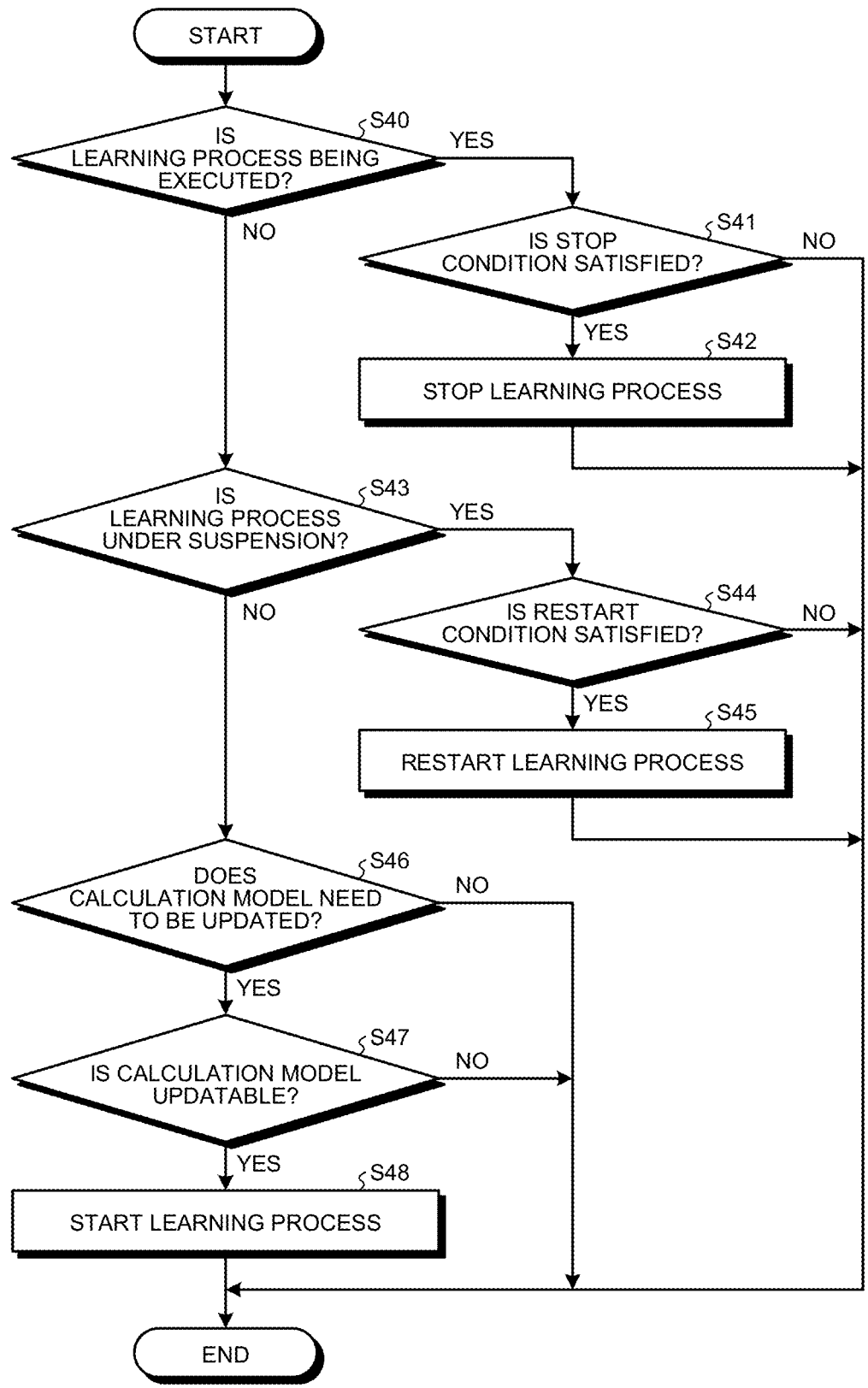
FIG. 10 is a flowchart illustrating an exemplary learning model process that is performed by the control device according to the first embodiment.

FIG. 10 is a flowchart illustrating an exemplary learning model process that is performed by the control device according to the first embodiment. The process illustrated in FIG. 10 is performed for each calculation model stored in the model storage unit 34. The following example describes the learning model process for the first calculation model $M1_1$ among the plurality of first calculation models $M1_1$ to $M1_m$ and the second calculation model M2 stored in the model storage unit 34. The learning model processes for the first calculation models $M1_2$ to $M1_m$ and the second calculation model M2 are performed in a similar manner to the learning model process for the first calculation model $M1_1$.

As illustrated in FIG. 10, the state determination unit 37 of the control device 3 determines whether the learning process for the first calculation model $M1_1$ is being executed (step S40). In response to determining that the learning process for the first calculation model $M1_1$ is being executed (step S40: Yes), the state determination unit 37 determines whether the load state of the computing resource satisfies the stop condition (step S41). In response to the state determination unit 37 determining that the load state of the computing resource satisfies the stop condition (step S41: Yes), the learning processing unit 33 stops the learning process for the first calculation model $M1_1$ (step S42).

In response to determining that the learning process for the first calculation model $M1_1$ is not being executed (step S40: No), the state determination unit 37 determines whether the learning process for the first calculation model $M1_1$ is under suspension (step S43). In response to determining that the learning process for the first calculation model $M1_1$ is under suspension (step S43: Yes), the state determination unit 37 determines whether the load state of the computing resource satisfies the restart condition (step S44). In response to the state determination unit 37 determining that the load state of the computing resource satisfies the restart condition (step S44: Yes), the learning processing unit 33 restarts the learning process for the first calculation model $M1_1$ (step S45).

In response to the state determination unit 37 determining that the learning process for the first calculation model $M1_1$ is not under suspension (step S43: No), the update determination unit 35 determines whether the first calculation model $M1_1$ needs to be updated (step S46). In response to the update determination unit 35 determining that the first calculation model $M1_1$ needs to be updated (step S46: Yes), the state determination unit 37 determines whether the first calculation model $M1_1$ is updatable based on the load state of the computing resource (step S47).

In response to the state determination unit 37 determining that the first calculation model $M1_1$ is updatable (step S47: Yes), the learning processing unit 33 starts the learning process for the first calculation model $M1_1$ in order to update the first calculation model $M1_1$ (step S48).

The control device 3 ends the process illustrated in FIG. 10 after step S42, after step S45, after step S48, in response to determining that the stop condition is not satisfied (step S41: No), in response to determining that the restart condition is not satisfied (step S44: No), in response to determining that the calculation model M need not be updated (step S46: No), or in response to determining that the calculation model M is not updatable (step S47: No).

Figure 11:
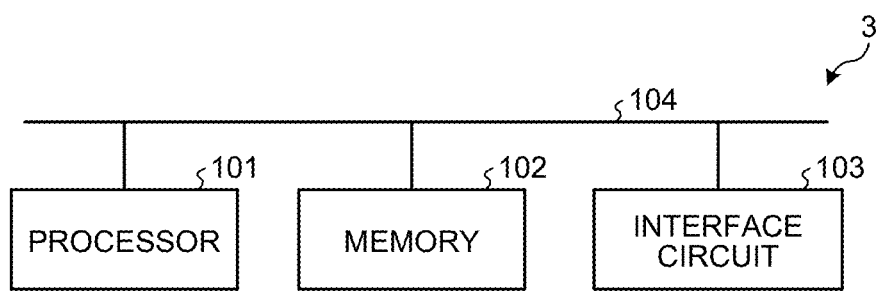
FIG. 11 is a diagram illustrating an exemplary hardware configuration of the control device according to the first embodiment.

FIG. 11 is a diagram illustrating an exemplary hardware configuration of the control device according to the first embodiment. As illustrated in FIG. 11, the control device 3 includes a processor 101, a memory 102, and an interface circuit 103.

The processor 101, the memory 102, and the interface circuit 103 can exchange data with one another via a bus 104. The communication unit 40 is implemented by the interface circuit 103. The learning data storage unit 32 and the model storage unit 34 are implemented by the memory 102. The processor 101 reads and executes a program stored in the memory 102 to execute the functions of the data acquisition unit 30, the data selection unit 31, the learning processing unit 33, the update determination unit 35, the simulator unit 36, the state determination unit 37, the computation unit 38, and the control unit 39. The processor 101 is an example of processing circuitry, and includes one or more of a CPU, a digital signal processer (DSP), and a system large scale integration (LSI).

The memory 102 includes one or more of a random access memory (RAM), a read only memory (ROM), a flash memory, and an erasable programmable read only memory (EPROM). The memory 102 includes a recording medium on which the above-mentioned computer-readable program is recorded. Such a recording medium includes one or more of a non-volatile or volatile semiconductor memory, a magnetic disk, a flexible memory, an optical disk, a compact disk, and a DVD.

In a case where the control device 3 is implemented by dedicated hardware, the data acquisition unit 30, the data selection unit 31, the learning processing unit 33, the update determination unit 35, the simulator unit 36, the state determination unit 37, the computation unit 38, and the control unit 39 are, for example, a single circuit, a composite circuit, a programmed processor, a parallel programmed processor, an application specific integrated circuit (ASIC), a field programmable gate array (FPGA), or a combination thereof.

In the example described above, the computation unit 38 computes the control target values RV1 and RV2 based on the output of the first calculation models $M1_1$ to $M1_m$. However, instead of the computation unit 38, the control unit 39 may compute the control target values RV1 and RV2 based on the output of the first calculation models $M1_1$ to $M1_m$.

In the example described above, control target devices controlled by the control device 3 are the blower 14 and the pump 15, but control target devices controlled by the control device 3 may include devices other than the blower 14 and the pump 15. For example, control target devices may be a heater that adjusts the temperature of water in the treatment tank 12 and a device that controls the introduction of chemical liquid into the treatment tank 12.

As described above, the water treatment plant 100 according to the first embodiment includes the central monitoring device 4 that monitors the plurality of water treatment apparatuses 1, the plurality of control devices 3 that each execute control of the corresponding water treatment apparatus 1 of the plurality of water treatment apparatuses 1, and the computation unit 38 that is located outside the central monitoring device 4 and performs computation related to the control of the water treatment apparatus 1 using the calculation model M generated by machine learning. Because the computation unit 38 is located outside the central monitoring device 4 in this manner, water treatment control can be effectively performed in the water treatment plant including a plurality of devices. Note that, for example, the water treatment apparatus $1_1$ corresponds to a first water treatment apparatus, the water treatment apparatus $1_n$ is an example of a second water treatment apparatus, the control device $3_1$ is an example of a first control device, and the control device $3_n$ is an example of a second control device. For example, the computation unit 38 included in the control device $3_1$ is an example of a first computation unit. The computation unit 38 included in the control device $3_n$ is an example of a second computation unit. The computation unit 38 included in the control device 3 is AI, and the control device 3 is, for example, an AI device.

The water treatment plant 100 includes the plurality of sensors 2 that each detect the state of the corresponding water treatment apparatus 1 of the plurality of water treatment apparatuses 1. Each of the plurality of control devices 3 executes control of the corresponding water treatment apparatus 1 of the plurality of water treatment apparatuses 1 based on the detection data D output from the corresponding sensor 2 of the plurality of sensors 2. Each of the plurality of control devices 3 includes the computation unit 38 that performs computation related to the control of the corresponding water treatment apparatus 1 of the plurality of water treatment apparatuses 1 using the calculation model M generated by machine learning. Consequently, the AI that performs computation related to water treatment control can be located near the water treatment apparatus 1. Therefore, for example, data transmission delays or the like can be reduced, and control processing for the water treatment apparatus 1 that is based on the detection data D output from the sensor 2 can be accelerated. Thus, water treatment control can be effectively performed in the water treatment plant 100 including the plurality of water treatment apparatuses 1. Note that, for example, the sensor $2_1$ is an example of a first sensor, and the sensor $2_n$ is an example of a second sensor. For example, the calculation model M used by the computation unit 38 included in the control device $3_1$ is an example of a first calculation model, and the calculation model M used by the computation unit 38 included in the control device $3_n$ is an example of a second calculation model.

The central monitoring device 4 monitors the water treatment apparatus 1 subjected to the control that is based on the computation by the computation unit 38 included in the control device 3. Consequently, the state of water treatment control in the water treatment apparatus 1 can be monitored by the central monitoring device 4.

The control device 3 includes the data selection unit 31, the learning data storage unit 32, and the learning processing unit 33. The data selection unit 31 selects, from among the detection data D, the detection data D that satisfy the preset condition. The detection data D that satisfy the preset condition among the detection data D are an example of condition-satisfying detection data. The learning data storage unit 32 stores the detection data D selected by the data selection unit 31. The learning processing unit 33 performs at least one of the generation and update of the calculation model M based on the detection data D stored in the learning data storage unit 32. Because the learning process for the calculation model M is performed by the control device 3 in this manner, AI-based water treatment control is available even when an abnormality occurs in the communication between the control device 3 and the central monitoring device 4, for example, and thus water treatment control can be effectively performed. Because the detection data D that satisfy the preset condition are selected from among the detection data D, the storage capacity of the learning data storage unit 32 can be reduced, as compared with the case where all the detection data D are used for the learning process for the calculation model M. Note that, for example, machine learning of the calculation model M for use in the computation unit 38 included in the control device $3_1$ is an example of a first machine learning, and machine learning of the calculation model M for use in the computation unit 38 included in the control device $3_n$ is an example of a second machine learning.

The control device 3 includes the state determination unit 37 that determines whether a learning process is possible based on the load state of the computing resource used for the learning process by the learning processing unit 33. The learning processing unit 33 executes the learning process based on the result of determination by the state determination unit 37. Consequently, for example, when the load of the computing resource is high, the learning process can be prevented from being executed. Therefore, for example, the learning process can be executed without affecting other processes in the control device 3, and the learning process can be executed even when the control device 3 has few computing resources.

The state determination unit 37 determines whether the load state satisfies the preset stop condition during the execution of the learning process by the learning processing unit 33. The learning processing unit 33 stops the execution of the learning process in response to the state determination unit 37 determining that the load state satisfies the stop condition during the execution of the learning process. Consequently, during the execution of the learning process, for example, a situation in which other processes in the control device 3 are affected can be avoided.

The control device 3 includes the update determination unit 35 that determines whether the calculation model M needs to be updated based on the result of computation with the calculation model M. The learning processing unit 33 executes the learning process based on the result of determination by the update determination unit 35. Consequently, for example, when the calculation model M is no longer suitable for prediction from the current state of the water treatment apparatus 1, the calculation model M can be updated. Therefore, for example, the frequency of updating the calculation model M can be reduced, as compared with the case of regularly updating the calculation model M. Thus, the calculation model M can be updated efficiently even when the control device 3 has few computing resources.

The calculation model M is a model that outputs the predicted value F of the state of the water treatment apparatus 1. The update determination unit 35 determines whether the calculation model M needs to be updated based on the difference between the measured value Da of the state of the water treatment apparatus 1 detected by the sensor 2 at the prediction time by the calculation model M and the predicted value F from the calculation model M. The prediction time by the calculation model M is the time after the period of time Ta described above. The difference between the measured value Da and the predicted value F is what is called a prediction error of the calculation model M. This makes it possible to accurately determine that the calculation model M is no longer suitable for prediction from the current state of the water treatment apparatus 1.

The control device 3 includes the simulator unit 36 that outputs a predicted value of the state of the water treatment apparatus 1 based on the state of the water treatment apparatus 1. The calculation model M is a calculation model that outputs the predicted value F of the state of the water treatment apparatus 1. The update determination unit 35 determines whether the calculation model M needs to be updated based on the difference between the predicted value from the simulator unit 36 and the predicted value F from the calculation model M. This makes it possible to accurately determine that the calculation model M is no longer suitable for prediction from the current state of the water treatment apparatus 1.

The control device 3 controls the water treatment apparatus 1 by proportional integration control or proportional integration differential control. Consequently, the water treatment apparatus 1 can be accurately controlled.

The above first embodiment describes an example in which the computation unit 38 computes control target values. However, the present invention is not limited to this example. For example, the computation unit 38 may compute a control operation amount, and the control unit 39 may be configured to control the water treatment apparatus 1 based on information on the control operation amount computed.

Second Embodiment

A second embodiment, in which the simulator unit is provided in the central monitoring device, differs from the first embodiment, in which the simulator unit is provided in the control device. In the following description, components having similar functions to those in the first embodiment are denoted by the same reference signs, and descriptions thereof are omitted. The difference from the water treatment plant 100 according to the first embodiment is mainly described.

Figure 12:
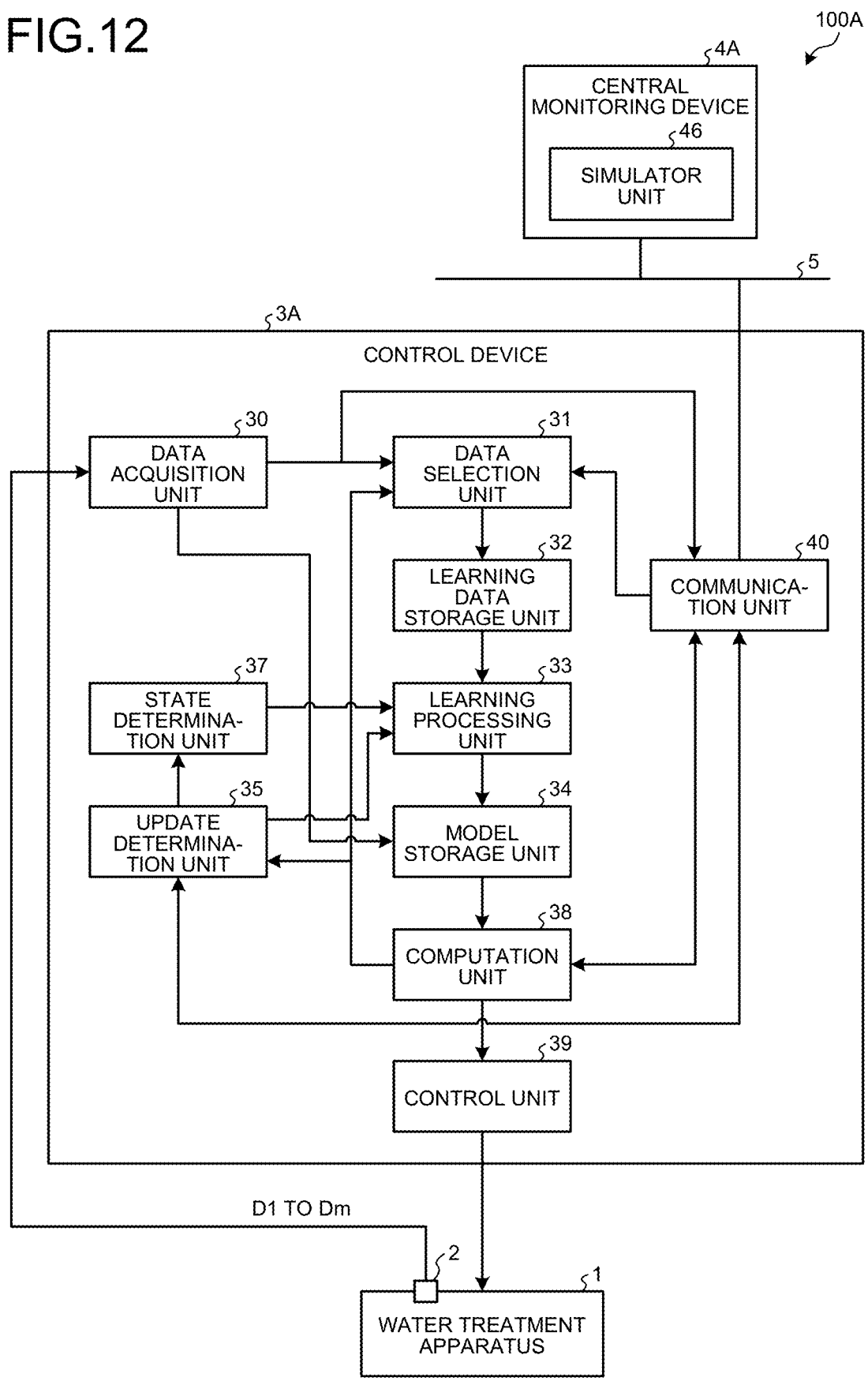
FIG. 12 is a diagram illustrating an exemplary configuration of a water treatment plant according to a second embodiment.

FIG. 12 is a diagram illustrating an exemplary configuration of a water treatment plant according to the second embodiment. As illustrated in FIG. 12, a water treatment plant 100A according to the second embodiment includes the water treatment apparatus 1, the sensor 2, a control device 3A, and a central monitoring device 4A. Although only one control device 3A is illustrated in FIG. 12, the water treatment plant 100A includes a plurality of control devices 3A, like the water treatment plant 100.

The control device 3A differs from the control device 3 in that the simulator unit 36 is not provided. The central monitoring device 4A differs from the central monitoring device 4 in that a simulator unit 46 is provided.

The simulator unit 46 has a similar function to the simulator unit 36. The simulator unit 46 performs computation with the activated sludge model. For example, the simulator unit 46 can acquire, from each control device 3, the detection data D output from the sensor 2, and predict, from the acquired detection data D, in-treatment-tank characteristics and treated water characteristics in each water treatment apparatus 1 through computation with the activated sludge model.

The update determination unit 35 of each control device 3A acquires, from the central monitoring device 4A, for example, predicted values of in-treatment-tank characteristics and predicted values of treated water characteristics computed by the simulator unit 46, and also acquires the predicted value F computed by the computation unit 38 using the first calculation model M1. The update determination unit 35 can compare the predicted values computed by the simulator unit 46 with the predicted value F from the first calculation model M1, and determine that the first calculation model M1 needs to be updated based on the result of comparison.

The hardware configuration example of the control device 3A according to the second embodiment is the same as that of the control device 3 according to the first embodiment except that the function of the simulator unit 36 is not provided. The central monitoring device 4A according to the second embodiment can have a configuration similar to the hardware configuration illustrated in FIG. 11. The processor 101 can execute the function of the simulator unit 46 by reading and executing a program stored in the memory 102.

As described above, the control device 3A according to the second embodiment does not include the simulator unit 36, and the central monitoring device 4A includes the simulator unit 46. Thus, the control device 3A can accelerate control processing for the water treatment apparatus 1 that is based on the detection data D output from the sensor 2 with a simpler configuration and at a lower manufacturing cost or the like than the control device 3. Because the plurality of control devices 3A perform learning model processes at different timings, efficient processing can be performed using the single simulator unit 46.

Third Embodiment

A third embodiment, in which the generation and update of a calculation model for use in each control device are performed by the central monitoring device, differs from the first embodiment, in which the generation and update of a calculation model are performed by each control device. In the following description, components having the similar functions to those in the first embodiment are denoted by the same reference signs, and descriptions thereof are omitted. The difference from the water treatment plant 100 according to the first embodiment is mainly described.

Figure 13:
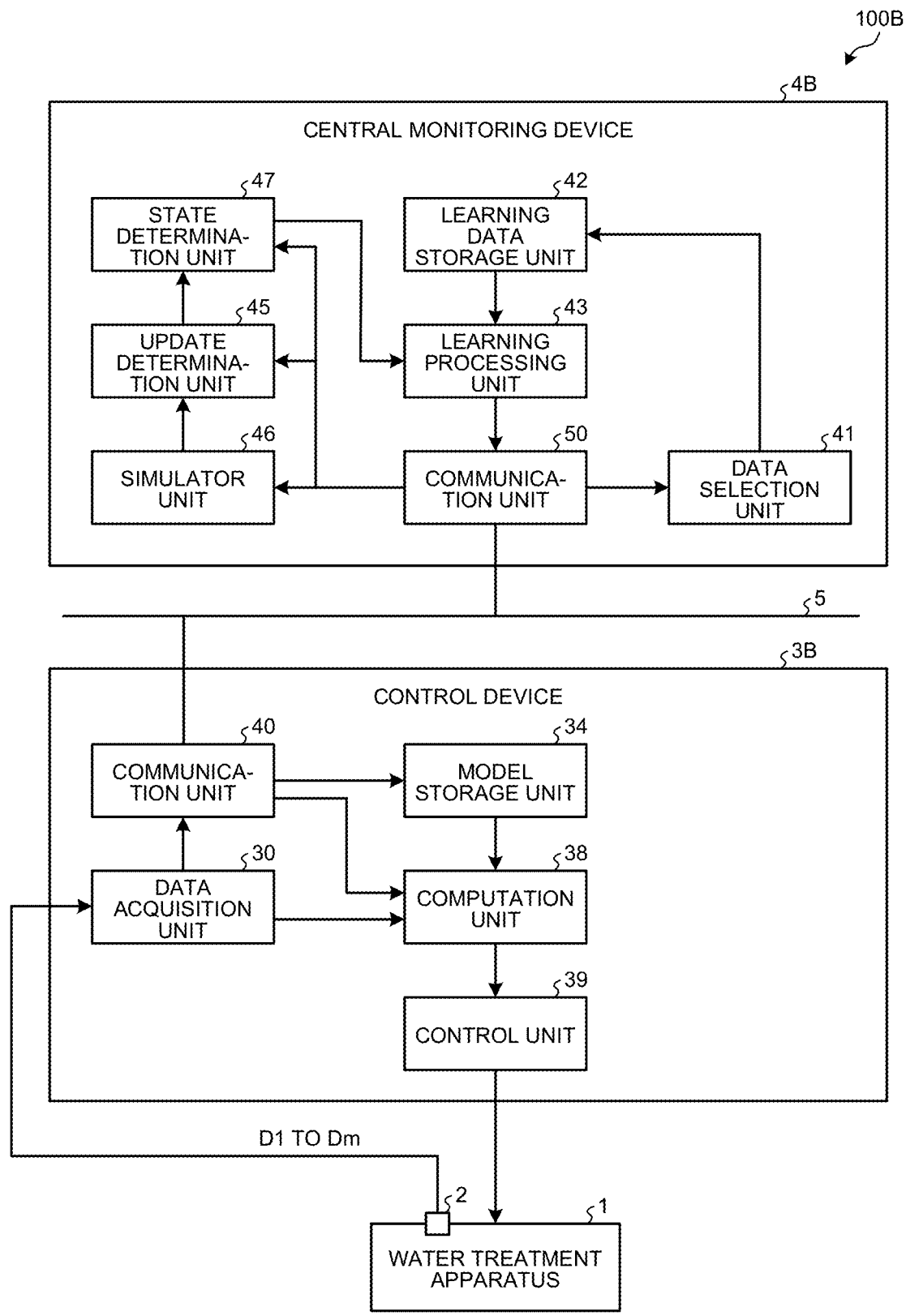
FIG. 13 is a diagram illustrating an exemplary configuration of a water treatment plant according to a third embodiment.

FIG. 13 is a diagram illustrating an exemplary configuration of a water treatment plant according to the third embodiment. As illustrated in FIG. 13, a water treatment plant 100B according to the third embodiment includes the water treatment apparatus 1, the sensor 2, a control device 3B, and a central monitoring device 4B. Although only one control device 3B is illustrated in FIG. 13, the water treatment plant 100B includes a plurality of control devices 3B, like the water treatment plant 100.

The control device 3B differs from the control device 3 in that the data selection unit 31, the learning data storage unit 32, the learning processing unit 33, the update determination unit 35, the simulator unit 36, and the state determination unit 37 are not provided. The central monitoring device 4B differs from the central monitoring device 4 in that a data selection unit 41, a learning data storage unit 42, a learning processing unit 43, an update determination unit 45, the simulator unit 46, a state determination unit 47, and a communication unit 50 are provided.

The data selection unit 41, the learning data storage unit 42, the learning processing unit 43, the update determination unit 45, the simulator unit 46, and the state determination unit 47 have the similar function to the data selection unit 31, the learning data storage unit 32, the learning processing unit 33, the update determination unit 35, the simulator unit 36, and the state determination unit 37, respectively.

In the example illustrated in FIG. 13, the data selection unit 41, the learning data storage unit 42, the learning processing unit 43, the update determination unit 45, the simulator unit 46, and the state determination unit 47 are shared by the plurality of control devices 3B and are used for the generation and update of a calculation model for use in each control device 3B. Note that the data selection unit 41, the learning data storage unit 42, the learning processing unit 43, the update determination unit 45, the simulator unit 46, and the state determination unit 47 may be provided for each control device 3B.

Note that the data selection unit 41, the update determination unit 45, the simulator unit 46, and the state determination unit 47 differ from the data selection unit 31, the update determination unit 35, the simulator unit 36, and the state determination unit 37, respectively, in that necessary data are acquired from each control device 3B via the communication network 5 and the communication unit 50. The learning processing unit 43 differs from the learning processing unit 33 in that the generated calculation model M is transmitted from the communication unit 50 to each control device 3B via the communication network 5. Each control device 3B stores, in the model storage unit 34, the calculation model M transmitted from the central monitoring device 4B.

The hardware configuration example of the control device 3B according to the third embodiment is the same as that of the control device 3 according to the first embodiment except that the functions of the data selection unit 31, the learning processing unit 33, the update determination unit 35, the simulator unit 36, and the state determination unit 37 are not provided and that the learning data storage unit 32 is not provided. The central monitoring device 4B according to the third embodiment can have a configuration similar to the hardware configuration illustrated in FIG. 11. The processor 101 can execute the functions of the data selection unit 41, the learning processing unit 43, the update determination unit 45, the simulator unit 46, and the state determination unit 47 by reading and executing a program stored in the memory 102. The learning data storage unit 42 is implemented by the memory 102.

As described above, the central monitoring device 4B according to the third embodiment generates the calculation model M for use in each control device 3B. Thus, the control device 3B can accelerate control processing for the water treatment apparatus 1 that is based on the detection data D output from the sensor 2 with a simpler configuration and at a lower manufacturing cost or the like than the control device 3. Because the plurality of control devices 3B perform learning model processes at different timings, efficient processing can be performed.

Fourth Embodiment

A fourth embodiment, in which the generation and update of a calculation model and computation with a calculation model are performed by the central monitoring device, differs from the first embodiment, in which the generation and update of a calculation model and computation with a calculation model are performed by the control device. In the following description, components having the similar functions to those in the first embodiment are denoted by the same reference signs, and descriptions thereof are omitted. The difference from the water treatment plant 100 according to the first embodiment is mainly described.

Figure 14:
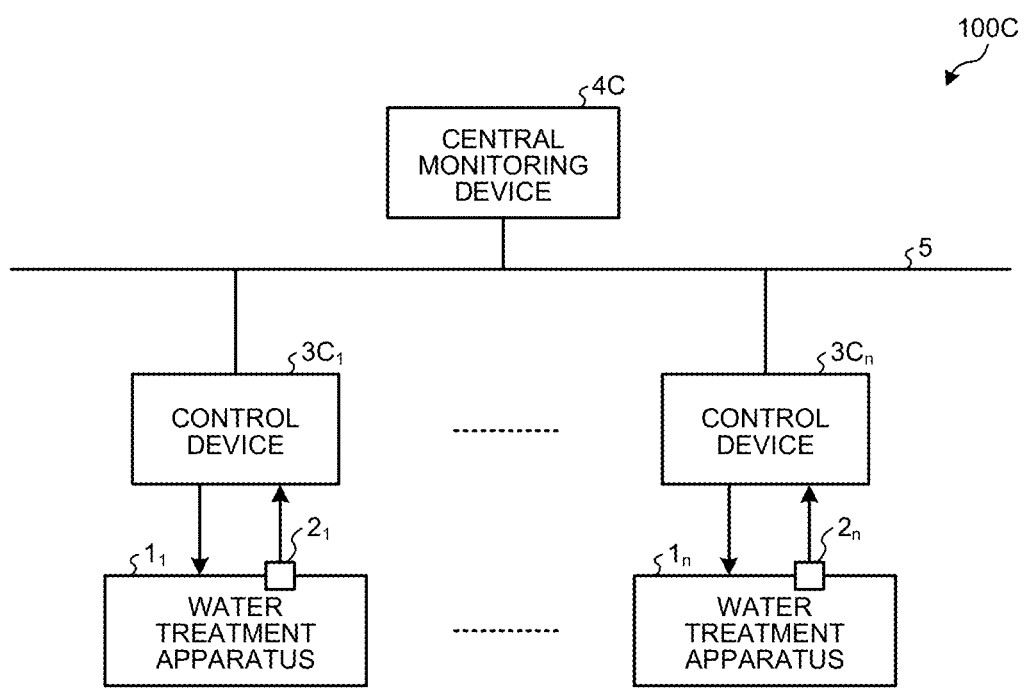
FIG. 14 is a diagram schematically illustrating a water treatment plant according to a fourth embodiment.

FIG. 14 is a diagram schematically illustrating a water treatment plant according to the fourth embodiment. As illustrated in FIG. 14, a water treatment plant 100C according to the fourth embodiment includes the plurality of water treatment apparatuses $1_1$ to $1_n$, the plurality of sensors $2_1$ to $2_n$, a plurality of control devices $3C_1$ to $3C_n$ that control the plurality of water treatment apparatuses $1_1$ to $1_n$, respectively, and a central monitoring device 4C that monitors the plurality of water treatment apparatuses $1_1$ to $1_n$. Note that reference character "n" is an integer of two or more. Hereinafter, when no distinction is made between the plurality of control devices $3C_1$ to $3C_n$, they are collectively referred to as the control device 3C.

Figure 15:
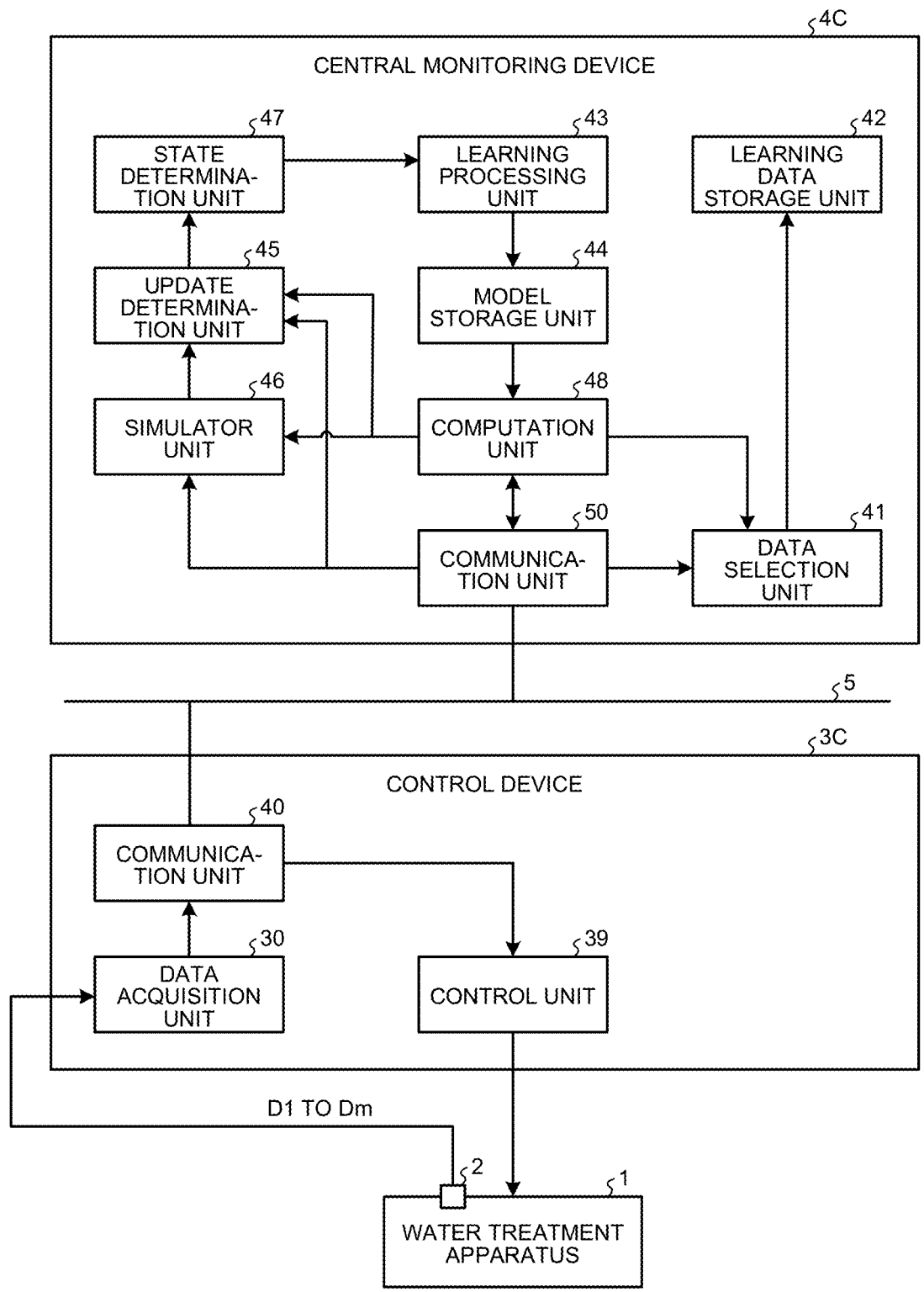
FIG. 15 is a diagram illustrating an exemplary configuration of a water treatment plant according to the fourth embodiment.

FIG. 15 is a diagram illustrating an exemplary configuration of the water treatment plant according to the fourth embodiment. In FIG. 15, only one of the plurality of control devices 3C illustrated in FIG. 14 is depicted. The control device 3C differs from the control device 3 in that the data selection unit 31, the learning data storage unit 32, the learning processing unit 33, the model storage unit 34, the update determination unit 35, the simulator unit 36, the state determination unit 37, and the computation unit 38 are not provided. The central monitoring device 4C differs from the central monitoring device 4 in that the data selection unit 41, the learning data storage unit 42, the learning processing unit 43, a model storage unit 44, the update determination unit 45, the simulator unit 46, the state determination unit 47, a computation unit 48, and the communication unit 50 are provided.

The data selection unit 41, the learning data storage unit 42, the learning processing unit 43, the model storage unit 44, the update determination unit 45, the simulator unit 46, the state determination unit 47, and the computation unit 48 have the similar function to the data selection unit 31, the learning data storage unit 32, the learning processing unit 33, the model storage unit 34, the update determination unit 35, the simulator unit 36, the state determination unit 37, and the computation unit 38, respectively.

In the example illustrated in FIG. 15, the data selection unit 41, the learning data storage unit 42, the learning processing unit 43, the model storage unit 44, the update determination unit 45, the simulator unit 46, the state determination unit 47, and the computation unit 48 are shared by the plurality of control devices 3C and are used for the generation and update of the calculation model M for use in each control device 3C and for computation with the calculation model M. In the central monitoring device 4C, the data selection unit 41, the learning data storage unit 42, the learning processing unit 43, the model storage unit 44, the update determination unit 45, the simulator unit 46, the state determination unit 47, and the computation unit 48 may be provided for each control device 3C.

Note that the data selection unit 41, the update determination unit 45, and the simulator unit 46 differ from the data selection unit 31, the update determination unit 35, and the simulator unit 36, respectively, in that necessary data are acquired from each control device 3C via the communication network 5 and the communication unit 50. The computation unit 48 differs from the computation unit 38 in that information on the control target value RV as a computation result is transmitted from the communication unit 50 to the control unit 39 via the communication network 5. Each control device 3C controls the water treatment apparatus 1 based on the information on the control target value RV transmitted from the central monitoring device 4C.

The hardware configuration example of the control device 3C according to the fourth embodiment is the same as that of the control device 3 according to the first embodiment except that the data selection unit 31, the learning data storage unit 32, the learning processing unit 33, the model storage unit 34, the update determination unit 35, the simulator unit 36, the state determination unit 37, and the computation unit 38 are not provided. The central monitoring device 4C according to the fourth embodiment can have a configuration similar to the hardware configuration illustrated in FIG. 11. The processor 101 can execute the functions of the data selection unit 41, the learning processing unit 43, the update determination unit 45, the simulator unit 46, the state determination unit 47, and the computation unit 48 by reading and executing a program stored in the memory 102. The learning data storage unit 42 and the model storage unit 44 are implemented by the memory 102.

As described above, the water treatment plant 100C according to the fourth embodiment includes the central monitoring device 4C that monitors the plurality of water treatment apparatuses 1, the plurality of sensors 2 that each detect the state of the corresponding water treatment apparatus of the plurality of water treatment apparatuses 1, and the plurality of control devices 3C that each execute control of the corresponding water treatment apparatus 1 of the plurality of water treatment apparatuses 1. The central monitoring device 4C includes the computation unit 48 that performs, using the calculation model M generated by machine learning, computation related to the control of each water treatment apparatus 1 that is based on the detection data D output from the sensor 2. Each of the plurality of control devices 3C executes control of the corresponding water treatment apparatus 1 of the plurality of water treatment apparatuses 1 based on the result of computation with the calculation model M by the central monitoring device 4C. Consequently, for example, AI-based water treatment control is available without changing the control devices in the water treatment system, and thus water treatment control can be effectively performed using AI by the water treatment plant 100C including the plurality of water treatment apparatuses 1. Because various past data are stored in the central monitoring device 4C, water treatment control can be efficiently performed.

Fifth Embodiment

A fifth embodiment, in which the generation and update of a calculation model and computation with a calculation model are performed by a cloud server, differs from the first and fourth embodiments, in which the generation and update of a calculation model and computation with a calculation model are performed by the control device or the central monitoring device. In the following description, components having the similar functions to those in the first and fourth embodiments are denoted by the same reference signs, and descriptions thereof are omitted. The difference from the water treatment plants 100 and 100C according to the first and fourth embodiments is mainly described.

Figure 16:
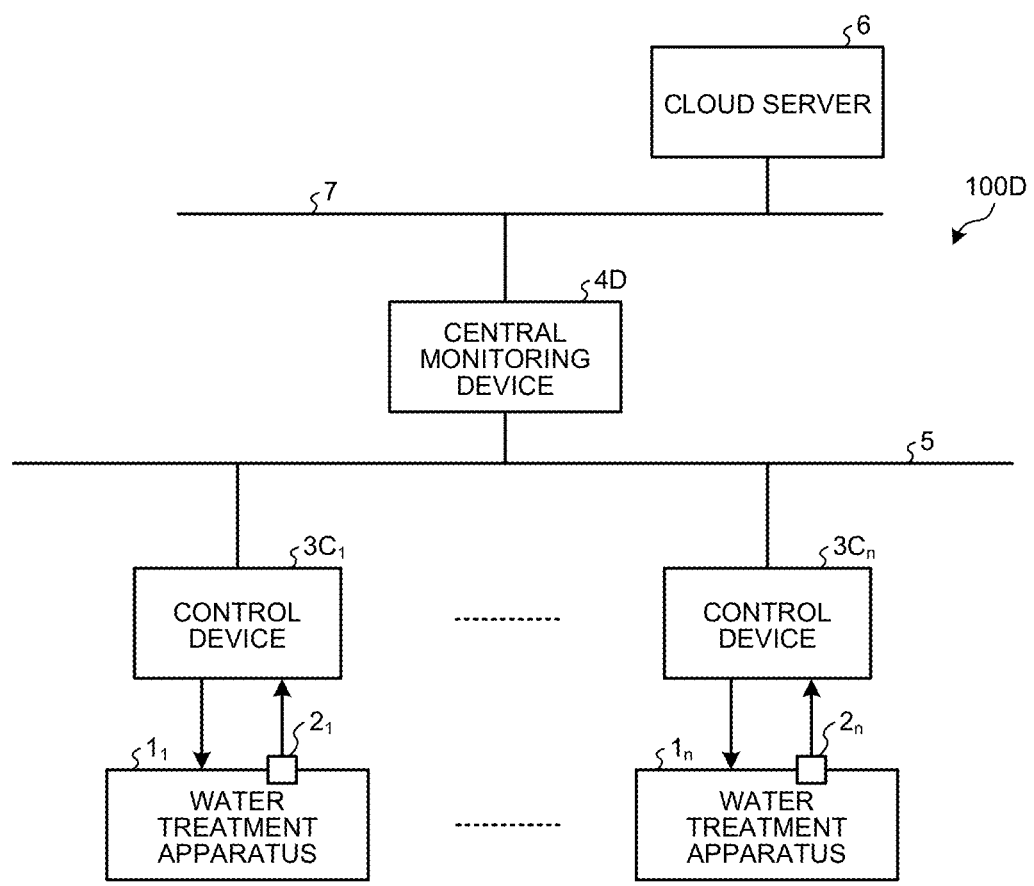
FIG. 16 is a diagram schematically illustrating a water treatment plant according to a fifth embodiment.

FIG. 16 is a diagram schematically illustrating a water treatment plant according to the fifth embodiment. As illustrated in FIG. 16, a water treatment plant 100D according to the fifth embodiment includes the plurality of water treatment apparatuses $1_1$ to $1_n$, the plurality of sensors $2_1$ to $2_n$, the control devices $3C_1$ to $3C_n$, and a central monitoring device 4D that monitors the plurality of water treatment apparatuses $1_1$ to $1_n$. Hereinafter, when no distinction is made between the plurality of control devices $3C_1$ to $3C_n$, they are collectively referred to as the control device 3C.

The central monitoring device 4D is communicably connected via a communication network 7 to a cloud server 6 that generates and updates the calculation model M and performs computation with the calculation model M. The communication network 7 is, for example, the Internet. The cloud server 6 is a server provided on the Internet. The central monitoring device 4D transmits the detection data D acquired from the control device 3C to the cloud server 6 via the communication network 7.

Figure 17:
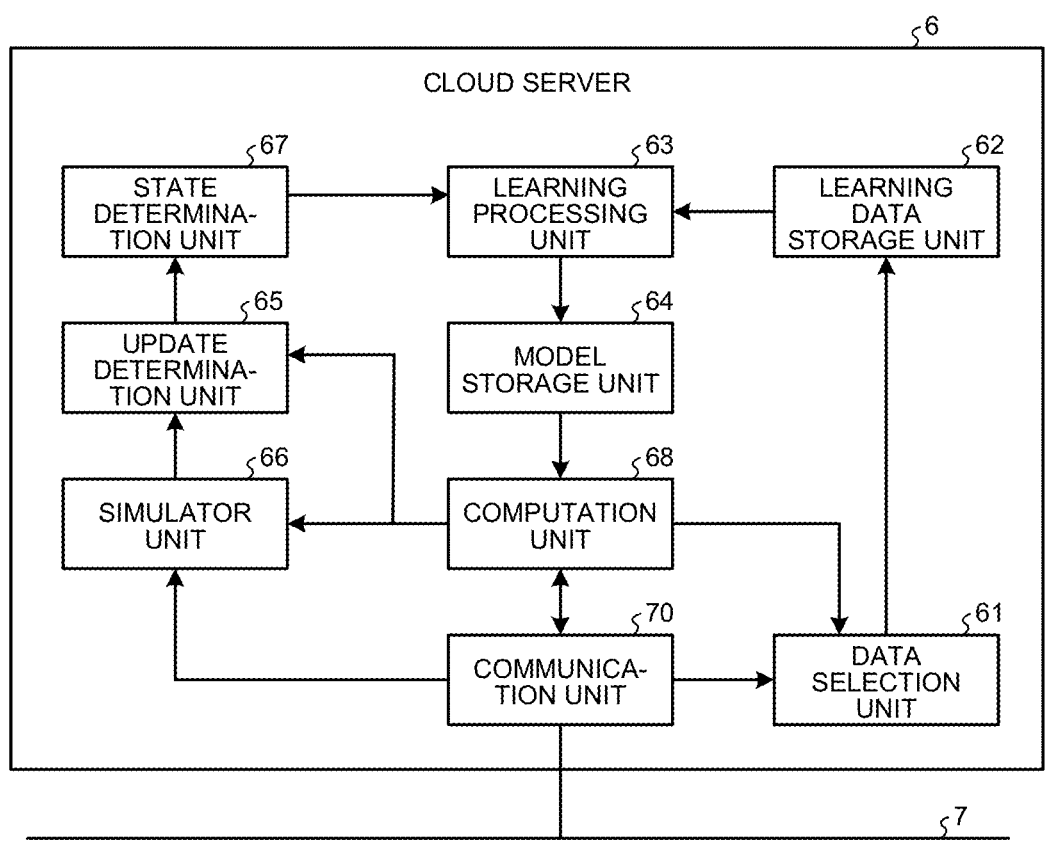
FIG. 17 is a diagram illustrating an exemplary configuration of a cloud server according to the fifth embodiment.

FIG. 17 is a diagram illustrating an exemplary configuration of the cloud server according to the fifth embodiment. As illustrated in FIG. 17, the cloud server 6 includes a data selection unit 61, a learning data storage unit 62, a learning processing unit 63, a model storage unit 64, an update determination unit 65, a simulator unit 66, a state determination unit 67, a computation unit 68, and a communication unit 70. The data selection unit 61, the learning data storage unit 62, the learning processing unit 63, the model storage unit 64, the update determination unit 65, the simulator unit 66, the state determination unit 67, and the computation unit 68 have the similar function to the data selection unit 31, the learning data storage unit 32, the learning processing unit 33, the model storage unit 34, the update determination unit 35, the simulator unit 36, the state determination unit 37, and the computation unit 38, respectively.

In the example illustrated in FIG. 17, the data selection unit 61, the learning data storage unit 62, the learning processing unit 63, the model storage unit 64, the update determination unit 65, the simulator unit 66, the state determination unit 67, and the computation unit 68 are shared by the plurality of control devices 3C and are used for the generation and update of the calculation model M for use in each control device 3C and for computation with the calculation model M. In the cloud server 6, the data selection unit 61, the learning data storage unit 62, the learning processing unit 63, the model storage unit 64, the update determination unit 65, the simulator unit 66, the state determination unit 67, and the computation unit 68 may be provided for each control device 3C.

Note that the data selection unit 61 differs from the data selection unit 31 in that the detection data D are acquired from the central monitoring device 4D via the communication network 7. The computation unit 68 differs from the computation unit 38 in that information on the control target value RV as a computation result is transmitted from the communication unit 70 to the central monitoring device 4D via the communication network 7. The central monitoring device 4D transmits the information on the control target value RV transmitted from the cloud server 6 to the control unit 39 of the control device 3C. The control unit 39 of the control device 3C controls the water treatment apparatus 1 based on the information on the control target value RV received from the central monitoring device 4D.

The hardware configuration example of the cloud server 6 according to the fifth embodiment can be similar to the hardware configuration illustrated in FIG. 11. The processor 101 can execute the functions of the data selection unit 61, the learning processing unit 63, the update determination unit 65, the simulator unit 66, the state determination unit 67, and the computation unit 68 by reading and executing a program stored in the memory 102. The learning data storage unit 62 and the model storage unit 64 are implemented by the memory 102.

As described above, the water treatment plant 100D according to the fifth embodiment includes the central monitoring device 4D that monitors the plurality of water treatment apparatuses 1, the plurality of control devices 3C that each execute control of the corresponding water treatment apparatus 1 of the plurality of water treatment apparatuses 1, and the computation unit 68 that is located outside the central monitoring device and performs computation related to the control of the water treatment apparatus 1 using the calculation model M generated by machine learning. The computation unit 68 is in the cloud server 6. Consequently, for example, AI-based water treatment control is available without changing the control devices in the water treatment system, and thus water treatment control can be effectively performed using AI by the water treatment plant 100D including the plurality of water treatment apparatuses 1. The cloud server 6 can manage a plurality of water treatment plants 100D, and the plurality of water treatment plants 100D can be efficiently operated using AI.

The water treatment plant 100D includes the plurality of sensors 2 that each detect the state of the corresponding water treatment apparatus 1 of the plurality of water treatment apparatuses 1. The cloud server 6 performs computation with the calculation model M generated by machine learning, the computation being related to the control of each water treatment apparatus 1 that is based on the detection data D output from the sensor 2. The control device 3C executes control of the corresponding water treatment apparatus 1 based on the result of computation by the computation unit 68 provided in the cloud server 6. In this way, the cloud server 6 performs computation with the calculation model M.

In the water treatment plant 100D, the control device 3C may be replaced with the control device 3B. In this case, the calculation model M generated by the learning processing unit 63 of the cloud server 6 is transmitted to the control device 3B via the central monitoring device 4D. The control device 3B can control the water treatment apparatus 1 using the calculation model M generated by the cloud server 6.

The configurations described in the above-mentioned embodiments indicate examples of the contents of the present invention. The configurations can be combined with another well-known technique, and a part of the configurations can be omitted or changed in a range not departing from the gist of the present invention.

REFERENCE SIGNS LIST

1, $1_1$ to $1_n$ water treatment apparatus; 2, $2_1$ to $2_n$, 20, $20_1$ to $20_m$ sensor; 3, 3A, 3B, 3C, $3_1$ to $3_n$, $3C_1$ to $3C_n$ control device; 4, 4A, 4B, 4C, 4D central monitoring device; 5, 7 communication network; 6 cloud server; 11 primary settling tank; 12 treatment tank; 13 final settling tank; 14 blower; 15 pump; 30 data acquisition unit; 31, 41, 61 data selection unit; 32, 42, 62 learning data storage unit; 33, 43, 63 learning processing unit; 34, 44, 64 model storage unit; 35, 45, 65 update determination unit; 36, 46, 66 simulator unit; 37, 47, 67 state determination unit; 38, 48, 68 computation unit; 39 control unit; 40, 50 communication unit; 51 blower control unit; 52 pump control unit; 100, 100A, 100B, 100C, 100D water treatment plant; D, D1 to Dm detection data; M calculation model; M1, $M1_1$ to $M1_m$ first calculation model; M2 second calculation model.

The invention claimed is:

1. A water treatment plant that causes a first water treatment apparatus and a second water treatment apparatus to execute water treatment, the water treatment plant comprising:
    a central monitoring circuitry to monitor the first water treatment apparatus and the second water treatment apparatus;
    a first controller to perform a first control for the first water treatment apparatus, the first controller being communicatively connected to the central monitoring circuitry via a network;
    a second controller, different from the first controller, to perform a second control for the second water treatment apparatus, the second controller being communicatively connected to the central monitoring circuitry via the network;
    first computation circuitry located outside the central monitoring circuitry;
    second computation circuitry, different from the first computation circuitry, located outside the central monitoring circuitry;
    a first sensor that detects a first water treatment environment of the first water treatment apparatus; and
    a second sensor that detects a second water treatment environment of the second water treatment apparatus,
    wherein the first computation circuitry performs a first computation for the first control using a first calculation model generated by a first machine learning,
    wherein the second computation circuitry performs a second computation for the second control using a second calculation model generated by a second machine learning,
    wherein the first controller performs the first control for the first water treatment apparatus based on the first computation for the first control using the first calculation model generated by the first machine learning,
    wherein the second controller performs the second control for the first water treatment apparatus based on the second computation for the second control using the second calculation model generated by the second machine learning,
    wherein the first controller includes:
        the first computation circuitry;
        data selection circuitry that selects, from among water treatment environment detection data from the first sensor, condition-satisfying detection data that satisfy a preset condition;
        a learning data memory that stores the condition-satisfying detection data selected by the data selection circuitry; and
        learning processing circuitry that executes a learning process to generate or update the first calculation model based on the condition-satisfying detection data stored in the learning data memory,
    wherein the first computation circuitry performs the first computation based on the first calculation model and the water treatment environment detection data from the first sensor, and
    wherein the second computation circuitry performs the second computation based on the second calculation model and water treatment environment detection data from the second sensor.

2. The water treatment plant according to claim 1, wherein the central monitoring circuitry monitors the first water treatment apparatus subjected to the first control that is based on the first computation.

3. The water treatment plant according to claim 1, wherein the first computation circuitry is AI.

4. The water treatment plant according to claim 1, wherein the central monitoring circuitry monitors the second water treatment apparatus subjected to the second control that is based on the second computation.

5. The water treatment plant according to claim 1, wherein the second computation circuitry is AI.

6. The water treatment plant according to claim 1, wherein the first computation circuitry and the second computation circuitry are in a cloud server.

7. The water treatment plant according to claim 1, wherein the first control device includes state determination circuitry that determines, prior to execution of the learning process, whether execution of the learning process is possible based on a load state of a computing resource used for the learning process by the learning processing circuitry, and
    the learning processing circuitry executes the learning process based on a result of determination by the state determination circuitry.

8. The water treatment plant according to claim 7, wherein the state determination circuitry determines whether the load state satisfies a preset stop condition during execution of the learning process by the learning processing circuitry, and
    the learning processing circuitry stops the execution of the learning process in response to the state determination circuitry determining that the load state satisfies the stop condition during the execution of the learning process.

9. The water treatment plant according to claim 1, comprising update determination circuitry that determines whether the first calculation model needs to be updated based on a result of the first computation with the first calculation model, wherein the learning processing circuitry executes the learning process based on a result of determination by the update determination circuitry.

10. The water treatment plant according to claim 9, wherein the first calculation model is a model that outputs a predicted value of a state of the first water treatment apparatus, and the update determination circuitry determines whether the first calculation model needs to be updated based on a difference between a measured value, from the first sensor, of the state of the first water treatment apparatus and the predicted value from the first calculation model.

11. The water treatment plant according to claim 9, comprising simulator circuitry that outputs a predicted value of a state of the first water treatment apparatus based on the state of the first water treatment apparatus, wherein the first calculation model is a model that outputs a predicted value of the state of the first water treatment apparatus, and the update determination circuitry determines whether the first calculation model needs to be updated based on a difference between the predicted value from the simulator circuitry and the predicted value from the first calculation model.

12. The water treatment plant according to claim 1, wherein the first controller performs the first control by proportional integral control or proportional integral differential control.

13. The water treatment plant according to claim 1, wherein the first controller is an AI device.

14. The water treatment plant according to claim 1, wherein the second controller includes:

the second computation circuitry;

a second data selection circuitry that selects, from the water treatment environment detection data from the second sensor, second condition-satisfying detection data that satisfy a second preset condition;

a second learning data memory that stores the second condition-satisfying detection data selected by the second data selection circuitry; and a second learning processing circuitry that executes a second learning process to generate or update the second calculation model based on the second condition-satisfying detection data stored in the second learning data memory.

15. The water treatment plant according to claim 1, wherein each of the first and second water treatment apparatuses is configured to treat sewage or to perform water purification.

16. The water treatment plant according to claim 1, wherein the first water treatment environment of the first water treatment apparatus is inside a first tank of the first water treatment apparatus, and wherein the second water treatment environment of the second water treatment apparatus is inside a second tank of the second water treatment apparatus.

17. The water treatment plant according to claim 1, wherein at least one of the first sensor and the second sensor sense water treatment characteristics selected from the group consisting of inflow amount, biochemical oxygen demand (BOD), concentration of $NH_3$, concentration of $NH_4^+$, and concentration of ammoniacal nitrogen.

18. The water treatment plant according to claim 1, wherein at least one of the first sensor and the second sensor sense water treatment characteristics selected from the group consisting of amount of dissolved oxygen, concentration of active microorganisms, biochemical oxygen demand (BOD), concentration of ammoniacal nitrogen, concentration of nitrate nitrogen, concentration of total nitrogen, concentration of phosphoric acid phosphorus, and concentration of total phosphorus.

19. The water treatment plant according to claim 1, wherein at least one of the first sensor and the second sensor sense water treatment characteristics selected from the group consisting of outflow amount, biochemical oxygen demand (BOD), and concentration of total nitrogen.

* * * * *